(12) United States Patent
Yamauchi et al.

(10) Patent No.: US 11,265,476 B2
(45) Date of Patent: Mar. 1, 2022

(54) IMAGING APPARATUS HAVING TWO MOUNT SURFACES TO MOUNT ACCESSORIES

(71) Applicant: SONY CORPORATION, Tokyo (JP)

(72) Inventors: Junpei Yamauchi, Kanagawa (JP); Hiroyume Ashida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/976,234

(22) PCT Filed: Dec. 26, 2018

(86) PCT No.: PCT/JP2018/047962
§ 371 (c)(1),
(2) Date: Aug. 27, 2020

(87) PCT Pub. No.: WO2019/171723
PCT Pub. Date: Sep. 12, 2019

(65) Prior Publication Data
US 2020/0412962 A1 Dec. 31, 2020

(30) Foreign Application Priority Data
Mar. 6, 2018 (JP) .............................. JP2018-040139

(51) Int. Cl.
*H04N 9/083* (2006.01)
*H04N 5/232* (2006.01)
(Continued)

(52) U.S. Cl.
CPC ....... *H04N 5/23296* (2013.01); *H04N 5/2252* (2013.01); *H04N 5/2254* (2013.01); *G03B 17/14* (2013.01)

(58) Field of Classification Search
CPC ...................................................... G03B 17/14
See application file for complete search history.

(56) References Cited

U.S. PATENT DOCUMENTS

2007/0248349 A1   10/2007 Nanjo
2012/0086849 A1*  4/2012 Wada ................... H04N 5/2254
                                                    348/344
(Continued)

FOREIGN PATENT DOCUMENTS

JP       6-47943 U    6/1994
JP    2007-219210 A   8/2007
(Continued)

OTHER PUBLICATIONS

Anonymous, "HDSLR Guide Chapter 4: Filters", achieved Nov. 26, 2015, from https://www.bhphotovideo.com/explora/photography/buying-guide/hdslr-guide-chapter-4-filters , all pages (Year: 2015).*

(Continued)

*Primary Examiner* — Gary C Vieaux
(74) *Attorney, Agent, or Firm* — Oblon, McClelland, Maier & Neustadt, L.L.P.

(57) ABSTRACT

Preferable optical performance is ensured to improve image quality.
The present technology includes: a housing having a mount part to which at least a first accessory and a second accessory are selectively attached; and an imaging element that photoelectrically converts captured light into an electrical signal, in which the mount part is formed with a first mount surface to which the first accessory is attached, and a second mount surface to which the second accessory is attached, and the first mount surface and the second mount surface are located on the same plane. Therefore, since the first accessory and the second accessory are selectively attached to the first mount surface and the second mount surface, which are located on the same plane, it is possible to ensure preferable optical performance and improve image quality.

13 Claims, 26 Drawing Sheets

(51) Int. Cl.
*H04N 5/225* (2006.01)
*G03B 17/14* (2021.01)

(56) References Cited

U.S. PATENT DOCUMENTS

2017/0242318 A1* 8/2017 Sato .................. H04N 5/23287
2018/0203213 A1   7/2018 Ueki et al.

FOREIGN PATENT DOCUMENTS

| JP | 2007-292828 A | 11/2007 |
| JP | 2013-92556 A | 5/2013 |
| JP | 2015-12533 A | 1/2015 |
| JP | 2016-133697 A | 7/2016 |
| WO | WO 2017/047229 A1 | 3/2017 |

OTHER PUBLICATIONS

International Search Report dated Apr. 2, 2019 in PCT/JP2018/047962 filed Dec. 26, 2018, 4 pages.

* cited by examiner

IMAGING APPARATUS HAVING TWO MOUNT SURFACES TO MOUNT ACCESSORIES

TECHNICAL FIELD

The present technology relates to a technical field of an imaging apparatus and an imaging unit in which an accessory is attachable to and detachable from a mount part.

BACKGROUND ART

Various imaging apparatuses such as video cameras and still cameras have accessories such as interchangeable lenses that is attachable to and detachable from a mount part, and for example, the functionality is improved by attaching the interchangeable lens to the mount part in some of the devices. Furthermore, the interchangeable lens is attached to the mount part via an adapter in some cases, and the adapter is also used as an accessory in the imaging apparatus (for example, see Patent Document 1).

In such an imaging apparatus having accessories that is attachable and detachable, it is possible to perform capturing in accordance with a capturing scene by attaching different types of accessories such as interchangeable lenses depending on the capturing mode, capturing purpose, and the like, and as a result, convenience is improved.

CITATION LIST

Patent Document

Patent Document 1: Japanese Patent Application Laid-Open No. 2013-92556

SUMMARY OF THE INVENTION

Problems to be Solved by the Invention

By the way, in the imaging apparatus as described above, an optical function parts having various functions such as a filter and an imaging element are arranged inside a housing, and it is required that preferable optical performance of these optical function parts is ensured to improve the quality of captured images.

In particular, in the imaging apparatus as described above in which the different accessories are selectively attachable to and detachable from the mount part, it is desirable that preferable optical performance is ensured to improve image quality regardless of which accessory is attached to the mount part.

Therefore, an object of an imaging apparatus and an imaging unit of the present technology is to overcome the problem described above, ensure preferable optical performance, and improve image quality.

Solutions to Problems

Firstly, an imaging apparatus according to the present technology includes: a housing having a mount part to which at least a first accessory and a second accessory are selectively attached; and an imaging element that photoelectrically converts captured light into an electrical signal, in which the mount part described above is formed with a first mount surface to which the first accessory is attached, and a second mount surface to which the second accessory is attached, and the first mount surface and the second mount surface are located on the same plane.

Therefore, the first accessory and the second accessory are selectively attached to the first mount surface and the second mount surface, respectively, which are located on the same plane.

Secondly, in the imaging apparatus according to the present technology described above, it is desirable that the first mount surface and the second mount surface are formed as parts of the same member.

Therefore, the first mount surface and the second mount surface are formed in the same member.

Thirdly, in another imaging apparatus according to the present technology described above, it is desirable that a contact is provided to which a terminal of the first accessory is connected in a state where the first accessory is attached to the first mount surface, and the contact is shielded by the second accessory in a state where the second accessory is attached to the second mount surface.

Therefore, the contact is shielded when the first accessory is not in use.

Fourthly, in the imaging apparatus according to the present technology described above, it is desirable that a positioning part that positions the first accessory and the second accessory in a direction orthogonal to an optical axis is formed in the housing.

Therefore, positioning of the first accessory and the second accessory in the direction orthogonal to the optical axis with respect to the housing is performed by one positioning part.

Fifthly, in the imaging apparatus according to the present technology described above, it is desirable that the imaging apparatus further includes: a first filter body having at least one neutral density filter that is located on an optical axis and reduces the amount of light toward the imaging element; and a second filter body having at least one neutral density filter that is spaced apart from the first filter body on the optical axis and reduces the amount of light toward the imaging element, the first filter body and the imaging element are located on the opposite side with the second filter body sandwiched therebetween, and the neutral density filter having the lowest optical density among the neutral density filters is provided in the first filter body.

Therefore, the first filter body provided with the neutral density filter having the lowest optical density is located on the opposite side of the imaging element with the second filter body sandwiched therebetween.

Sixthly, in the imaging apparatus according to the present technology described above, it is desirable that an infrared cut filter is arranged on the opposite side of the second filter body with the first filter body sandwiched therebetween.

Therefore, light transmitted through the infrared cut filter is incident on the neutral density filter.

Seventhly, in the imaging apparatus according to the present technology described above, it is desirable that each of the first filter body and the second filter body is rotatable, and the first filter body and the second filter body are provided with a plurality of the neutral density filters described above having different optical densities and spaced apart in the circumferential direction.

Therefore, the number of combinations of neutral density filters having different optical densities is increased by rotating the first filter body and the second filter body.

Ninthly, an imaging unit according to the present technology includes: a housing having a mount part to which at least a first accessory and a second accessory are selectively attached; and an imaging element that is arranged inside the housing, and photoelectrically converts captured light into an electrical signal, in which the mount part described above is formed with a first mount surface to which the first accessory is attached, and a second mount surface to which the second accessory is attached, and the first mount surface and the second mount surface are located on the same plane.

Therefore, the first accessory and the second accessory are selectively attached to the first mount surface and the second mount surface, respectively, which are located on the same plane.

Sixthly, another imaging apparatus according to the present technology includes: an imaging element that photoelectrically converts captured light into an electrical signal; a first filter body having at least one neutral density filter that is located on an optical axis and reduces the amount of light toward the imaging element; and a second filter body having at least one neutral density filter that is spaced apart from the first filter body on the optical axis and reduces the amount of light toward the imaging element, in which the first filter body and the imaging element are located on the opposite side with the second filter body sandwiched therebetween, and the neutral density filter having the lowest optical density among the neutral density filters is provided in the first filter body.

Therefore, the first filter body provided with the neutral density filter having the lowest optical density is located on the opposite side of the imaging element with the second filter body sandwiched therebetween.

Tenthly, in the another imaging apparatus according to the present technology described above, it is desirable that an infrared cut filter is arranged on the opposite side of the second filter body with the first filter body sandwiched therebetween.

Therefore, light transmitted through the infrared cut filter is incident on the neutral density filter.

Eleventhly, in the another imaging apparatus according to the present technology described above, it is desirable that each of the first filter body and the second filter body is rotatable, and the first filter body and the second filter body are provided with a plurality of the neutral density filters having different optical densities and spaced apart in the circumferential direction.

Therefore, the number of combinations of neutral density filters having different optical densities is increased by rotating the first filter body and the second filter body.

Effects of the Invention

According to the present technology, it is possible to ensure preferable optical performance to improve image quality.

Note that the effects described in the present specification are merely examples and are not intended to be limiting, and other effects may be provided.

BRIEF DESCRIPTION OF DRAWINGS

FIG. 16 is an exploded perspective view showing a handle, a finder unit, and the like.

MODE FOR CARRYING OUT THE INVENTION

Embodiments for implementing an imaging apparatus and an imaging unit of the present technology will be described below with reference to accompanying drawings.

The embodiments shown below is an application of the imaging apparatus and the imaging unit of the present technology to a video camera and an imaging unit provided in the video camera.

Note that the application range of the present technology is not limited to the video camera and the imaging unit provided in the video camera. The present technology can be widely applied to, for example, various other imaging apparatuses such as still cameras other than video cameras, and imaging units provided in these various imaging apparatuses.

In the description below, the front, rear, up, down, right, and left directions will be indicated in the direction viewed from the person who performs capturing at the time of video camera capturing. Therefore, the object side is front and the image plane side is rear.

Note that the front, rear, up, down, right, and left directions shown below are for convenience of description, and the implementation of the present technology is not limited to these directions.

Furthermore, the lens group shown below may include one or a plurality of lenses, and in addition, may include one or a plurality of such lenses and other optical elements such as a diaphragm and an iris.

<Configuration of Imaging Apparatus>

An imaging apparatus 1 has an apparatus body 2 and an imaging unit 3, and the imaging unit 3 is attachable to and detachable from the apparatus body 2 (see FIGS. 1 to 4). Note that the apparatus body 2 may be provided as an external device for the imaging unit 3, and in this case, the imaging unit 3 is attachable to and detachable from the external device. Furthermore, the imaging unit 3 may be provided as an imaging apparatus by itself.

Figure 4:
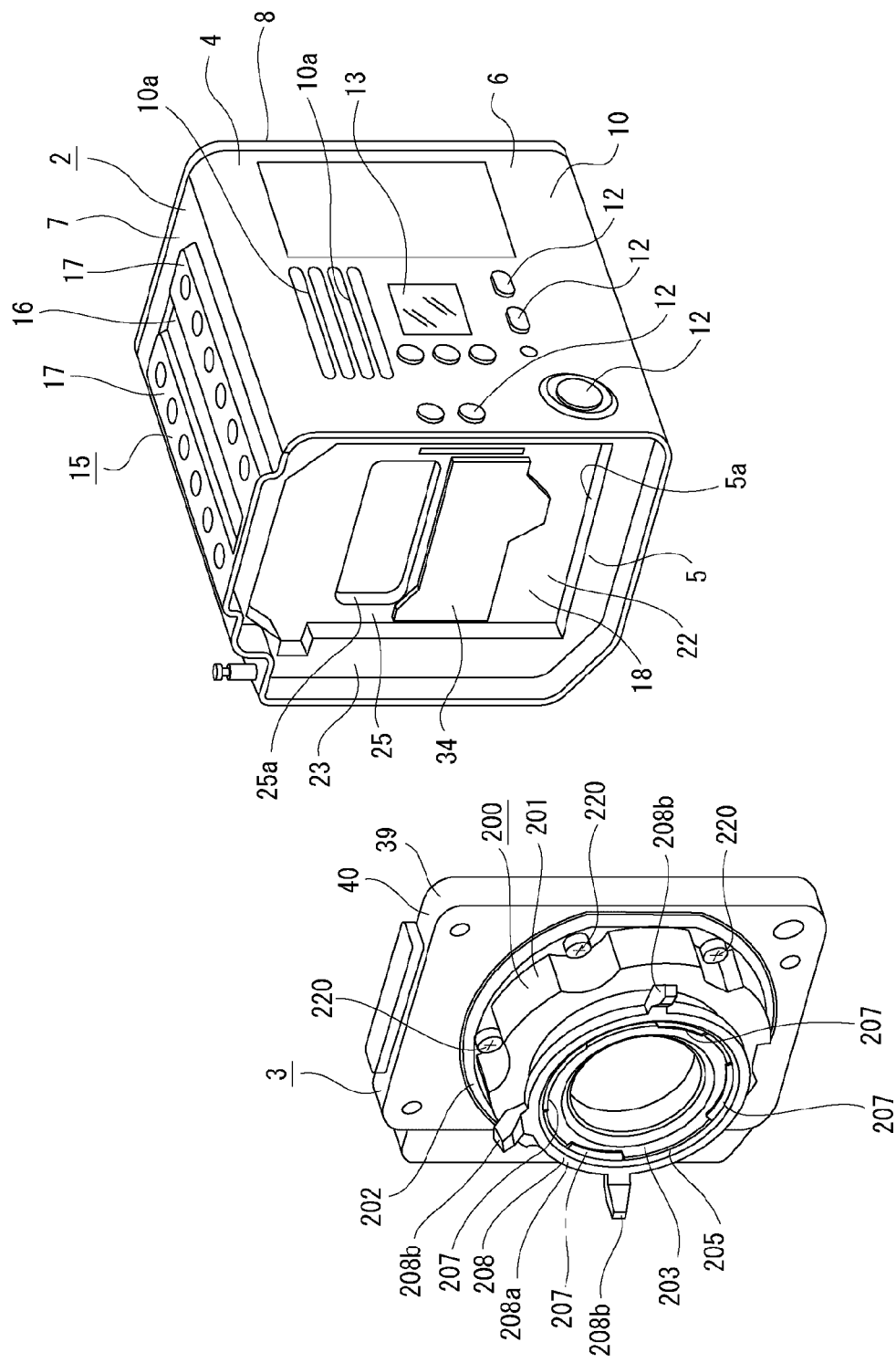
FIG. 4 is a perspective view of the imaging apparatus showing a state where an imaging unit is detached from an apparatus body.
Figure 5:
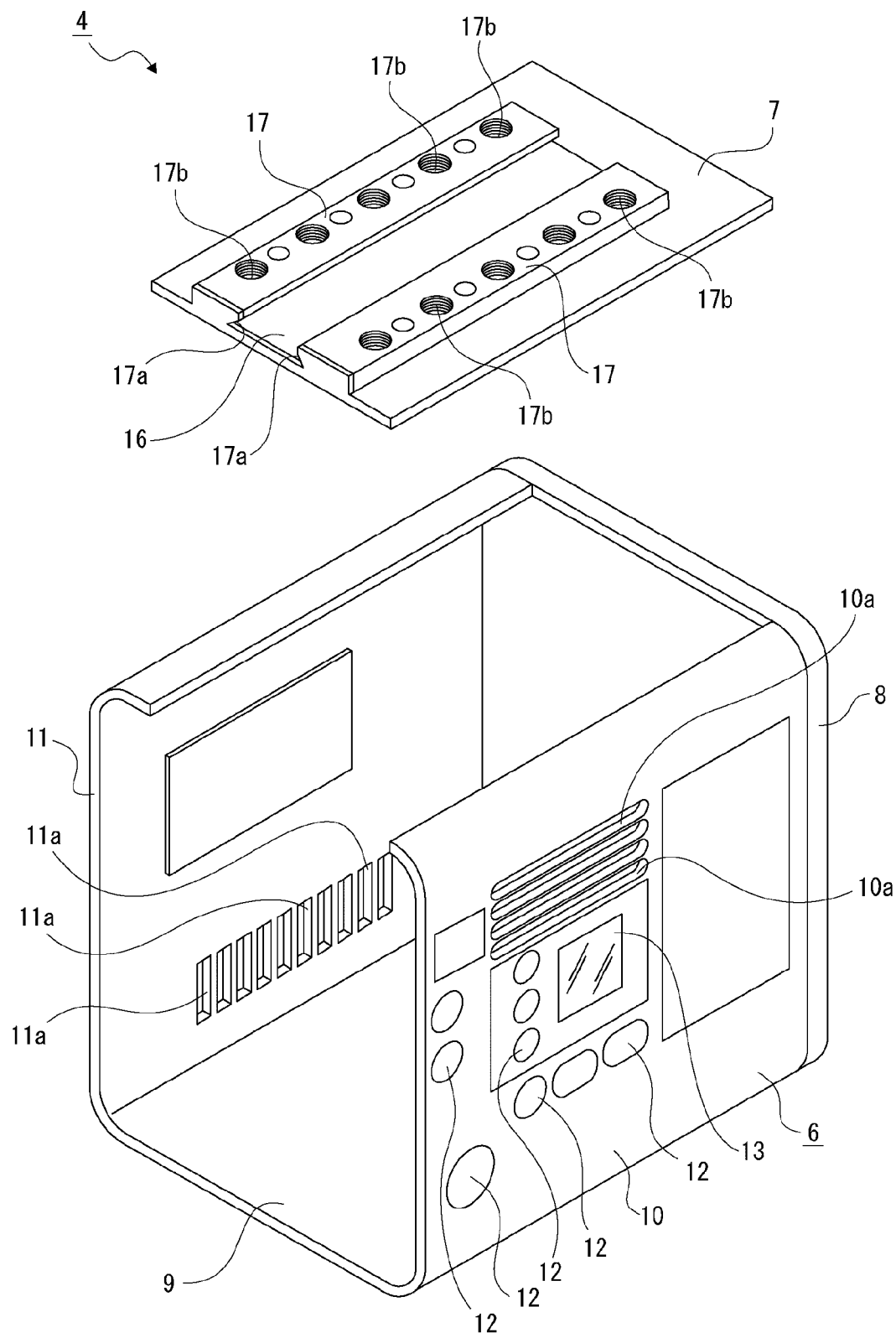
FIG. 5 is an exploded perspective view showing an outer panel.

The apparatus body 2 has an outer panel 4 and an outer casing 5, and has a structure in which the outer casing 5 is covered by the outer panel 4 (see FIGS. 4 and 5).

The outer panel 4 has a base panel part 6, an upper panel part 7, and a rear panel part 8, and the base panel part 6 has a bottom surface part 9 oriented in the up and down direction, and a pair of side surface parts 10 and 11 that are continuous to right and left edges of the bottom surface part 9, respectively, and are spaced apart from each other in right and left.

Various operation parts 12, 12, . . . are arranged on the side surface parts 10 and 11 of the base panel part 6. As the operation parts 12, 12, . . . , for example, a power button, a capturing button, a zoom knob, a mode switching knob, and the like are provided. Display parts 13 and 13 such as liquid crystal panels are arranged on the side surface parts 10 and 11, respectively.

At positions near the upper end of the side surface part 10, for example, inflow holes 10a, 10a, . . . extending in right and left are formed and arrayed in up and down. At positions near the lower end of the side surface part 11, for example, outflow holes 11a, 11a, . . . extending in up and down are formed and arrayed in right and left.

Figure 1:
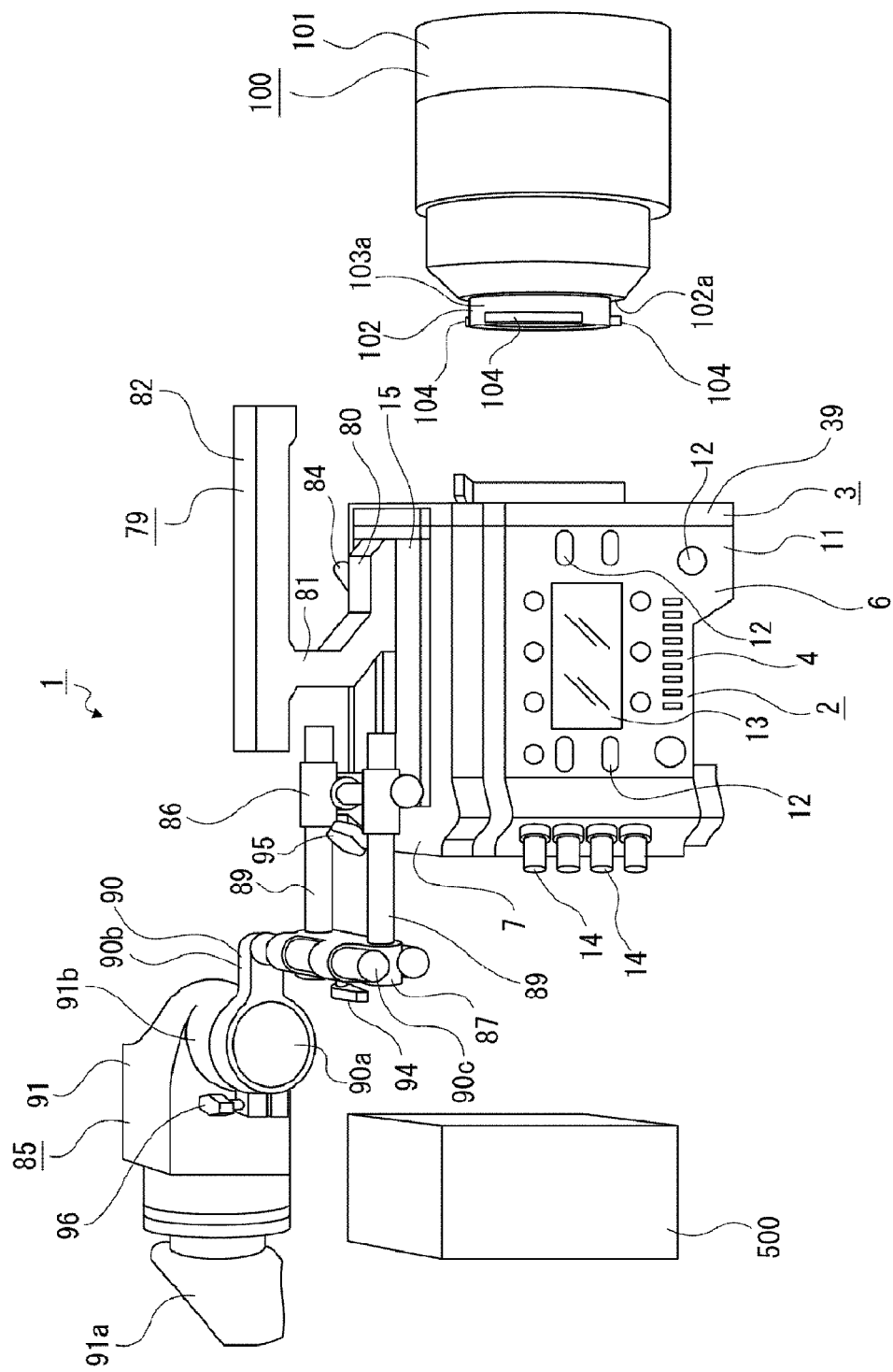
FIG. 1 shows an embodiment of the present technology together with FIGS. 2 to 29, and is a perspective view showing a first accessory and an imaging apparatus.
Figure 2:
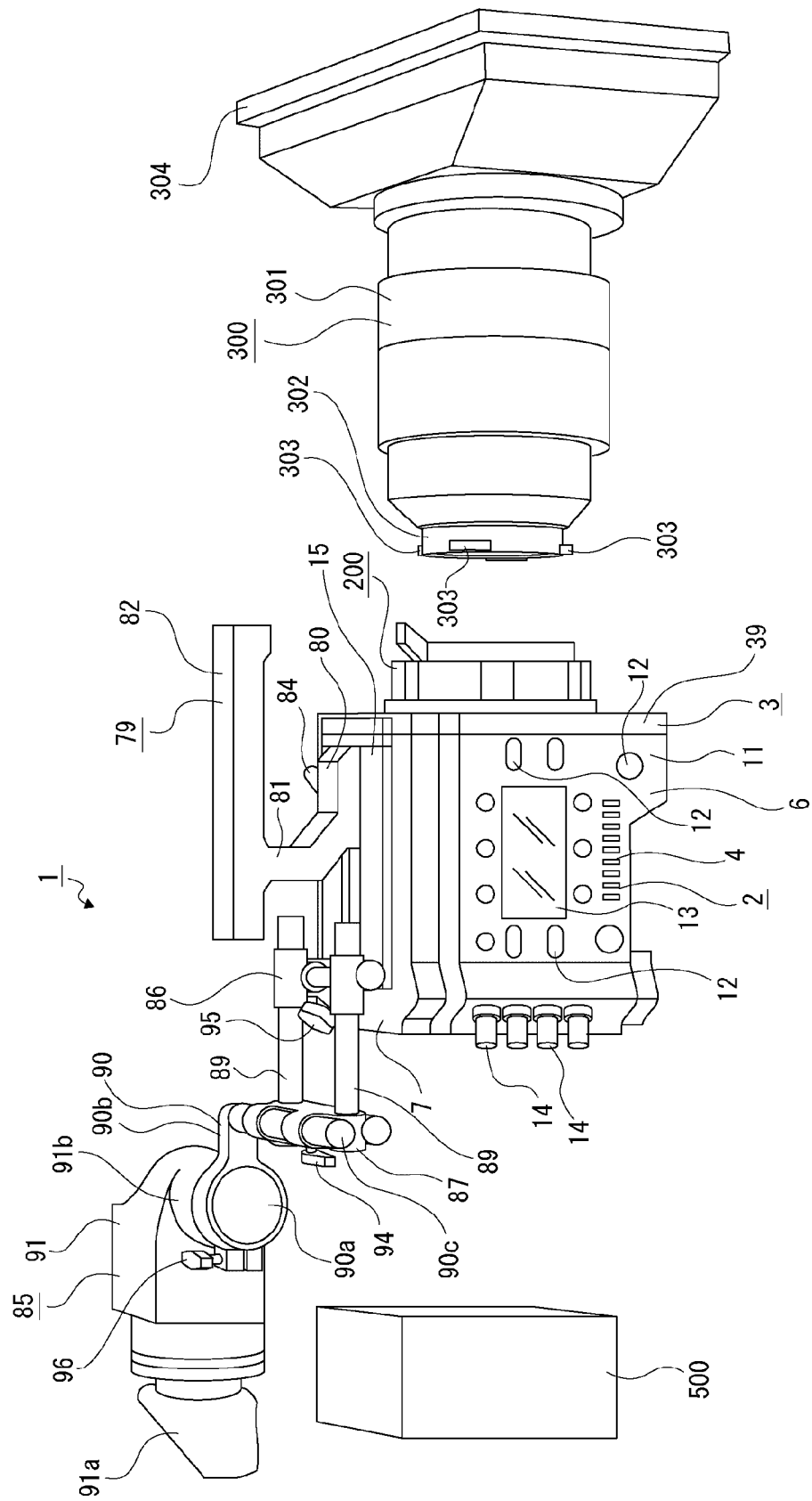
FIG. 2 is a perspective view showing a second accessory, a third accessory, and the imaging apparatus.

Connection terminals 14, 14, . . . are arranged and arrayed in up and down on one side portion of the rear panel part 8 (see FIGS. 1 and 2). Cables (not shown) for supplying power, transmitting and receiving signals, or the like are connected to the connection terminals 14, 14, . . . .

The upper panel part 7 is formed in a plate shape that faces in the up and down direction, and both right and left end portions are attached to the upper end portions of the side surface parts 10 and 11, respectively (see FIGS. 4 and 5).

The rear panel part 8 is formed in a plate shape that faces in the front and rear direction, and an outer circumferential portion is attached to a rear end portion of the base panel part 6 and a rear end portion of the upper panel part 7.

As described above, the outer panel 4 is configured by attaching the upper panel part 7 to the side surface parts 10 and 11 and the rear panel part 8 to the base panel part 6 and the upper panel part 7, and the outer casing 5 is covered from up, down, right and left and rear by the outer panel 4 (see FIG. 4).

Figure 3:
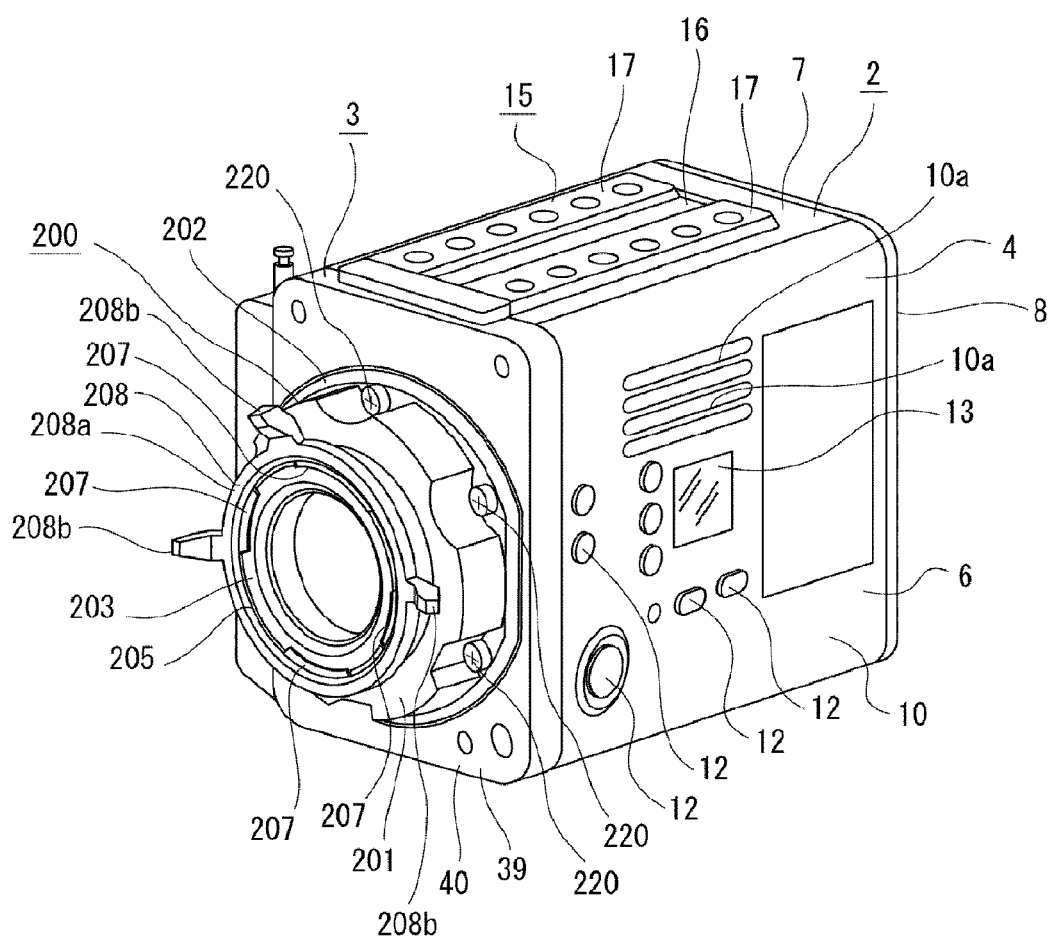
FIG. 3 is a perspective view of the imaging apparatus showing a state where the second accessory is attached.

An adjustment table 15 is attached to the upper surface of the upper panel part 7 (see FIGS. 3 to 5). The adjustment table 15 is formed in a vertically long rectangular shape, a center portion in the right and left direction is formed as a concave groove part 16, and portions on both right and left sides of the groove part 16 are provided as adjustment parts 17 and 17. Slide grooves 17a and 17a, which are opened to the groove part 16 side and extend in front and rear, are formed in the portions of the groove part 16 side in the lower end portions of the adjustment parts 17 and 17, respectively. The adjustment screw holes 17b, 17b, . . . are formed and arrayed in front and rear in the adjustment parts 17 and 17.

Figure 6:
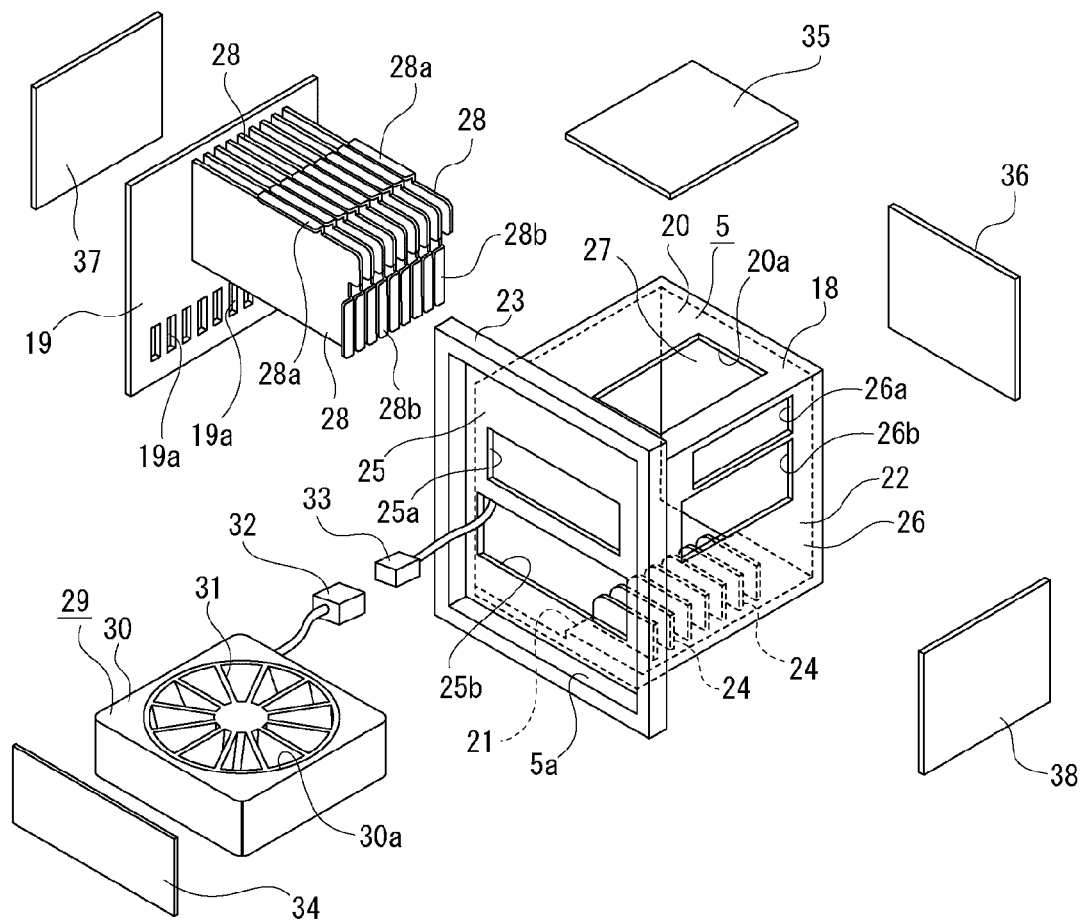
FIG. 6 is an exploded perspective view of the apparatus body.
Figure 7:
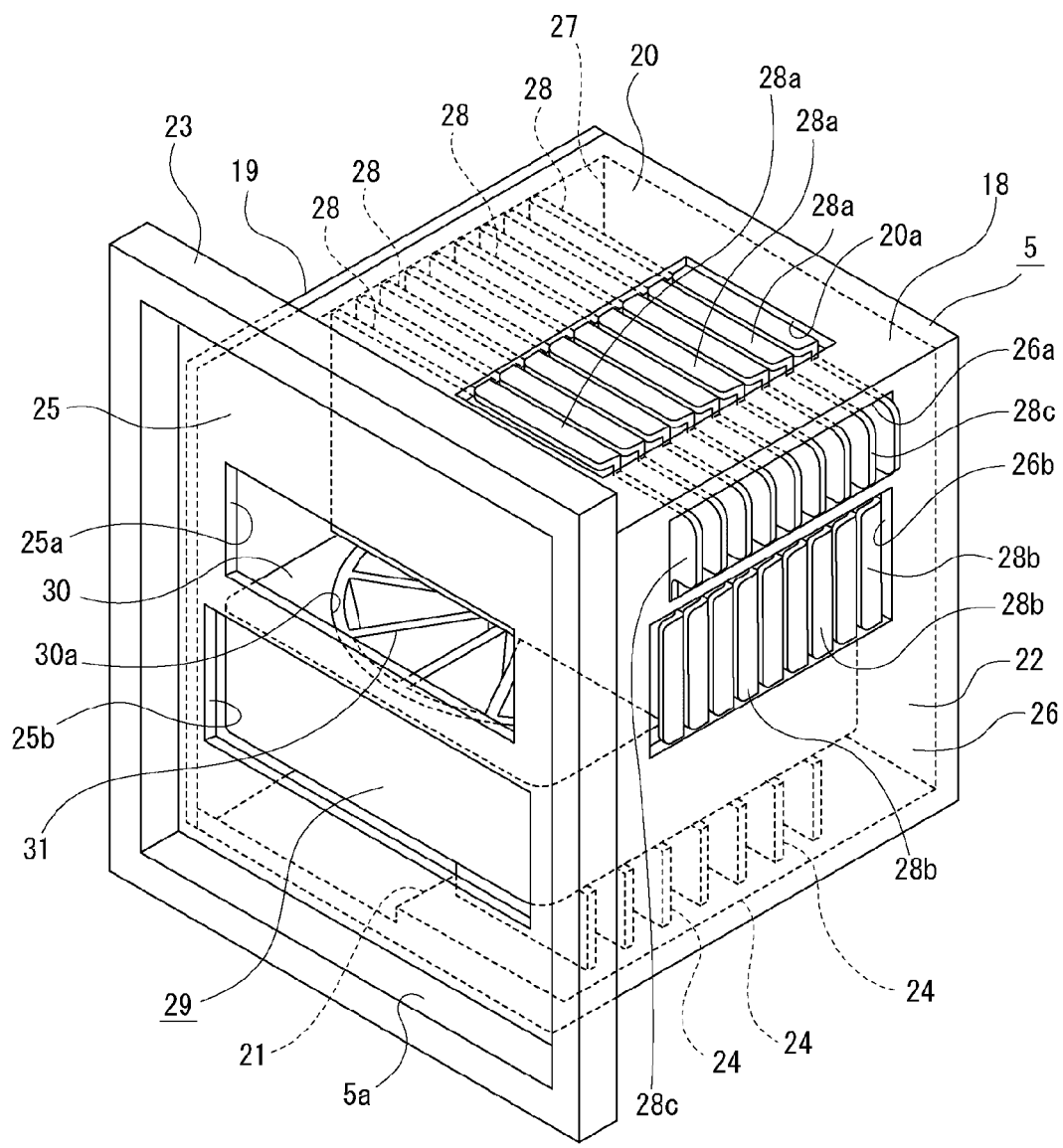
FIG. 7 is a perspective view of the apparatus body.

The outer casing 5 is formed by, for example, a metal material having high thermal conductivity, and has a body frame 18 and a side surface plate 19 (see FIGS. 6 and 7).

The body frame 18 has: a top surface plate 20 that faces in the up and down direction; a bottom surface plate 21 that is located directly below the top surface plate 20 and faces in the up and down direction; a circumferential surface plate 22 whose an upper edge is continuous to the outer circumferential edge of the top surface plate 20, and a lower edge is continuous to the outer circumferential edge of the bottom surface plate 21; and a frame surface part 23 formed in a frame shape.

The top surface plate 20 is formed with an insertion hole 20a penetrating in up and down.

Heat radiation fins 24, 24, . . . are joined and arrayed in front and rear on the top surface side of the bottom surface plate 21.

The circumferential surface plate 22 includes: a front surface plate 25 whose upper and lower edges are continuous to a front edge of the top surface plate 20 and a front edge of the bottom surface plate 21, respectively; a side surface plate 26 whose upper and lower edges are continuous to the a left side edge of the top surface plate 20 and a left side edge of the bottom surface plate 21, respectively; and a rear surface plate 27 whose upper and lower edges are continuous to a rear edge of the top surface plate 20 and a rear edge of the bottom surface plate 21, respectively. In the front surface plate 25, a fin insertion hole 25a and an insertion hole 25b penetrating in front and rear are spaced apart from each other in up and down. In the side surface plate 26, an intake hole 26a and an insertion hole 26b each penetrating in right and left, respectively, are formed and spaced apart in up and down.

The frame surface part 23 is continuous to the outer circumferential portion of the front surface plate 25 and is formed in a substantially rectangular shape. An arrangement space 5a surrounded by the frame surface part 23 and the front surface plate 25 is formed in the outer casing 5.

The side surface plate 19 faces the right and left direction and is attached to the right end portion of the body frame 18. Exhaust holes 19a, 19a, . . . penetrating in right and left are formed and arrayed in front and rear in the side surface plate 19.

Heat radiation fins 28, 28, . . . are joined and arrayed in front and rear on the left side surface of the side surface plate 19. A part of the upper end portion of the heat radiation fin 28 is bent at a right angle to be provided as a first joint part 28a, and a part of the left end portion is bent at a right angle to be provided as a second joint part 28b. The heat radiation fin 28 has a left end portion at the upper end portion provided as a protruding insertion part 28c protruding leftward with respect to other portions.

In the heat radiation fins 28, 28, . . . , the first joint parts 28a, 28a, . . . are inserted through the insertion hole 20a of the top surface plate 20, and the second joint parts 28b, 28b, . . . are inserted through the insertion hole 26b of the side surface plate 26. In the heat radiation fins 28, 28, . . . , the protruding insertion parts 28c, 28c, . . . are inserted to the intake hole 26a of the side surface plate 26.

Figure 8:
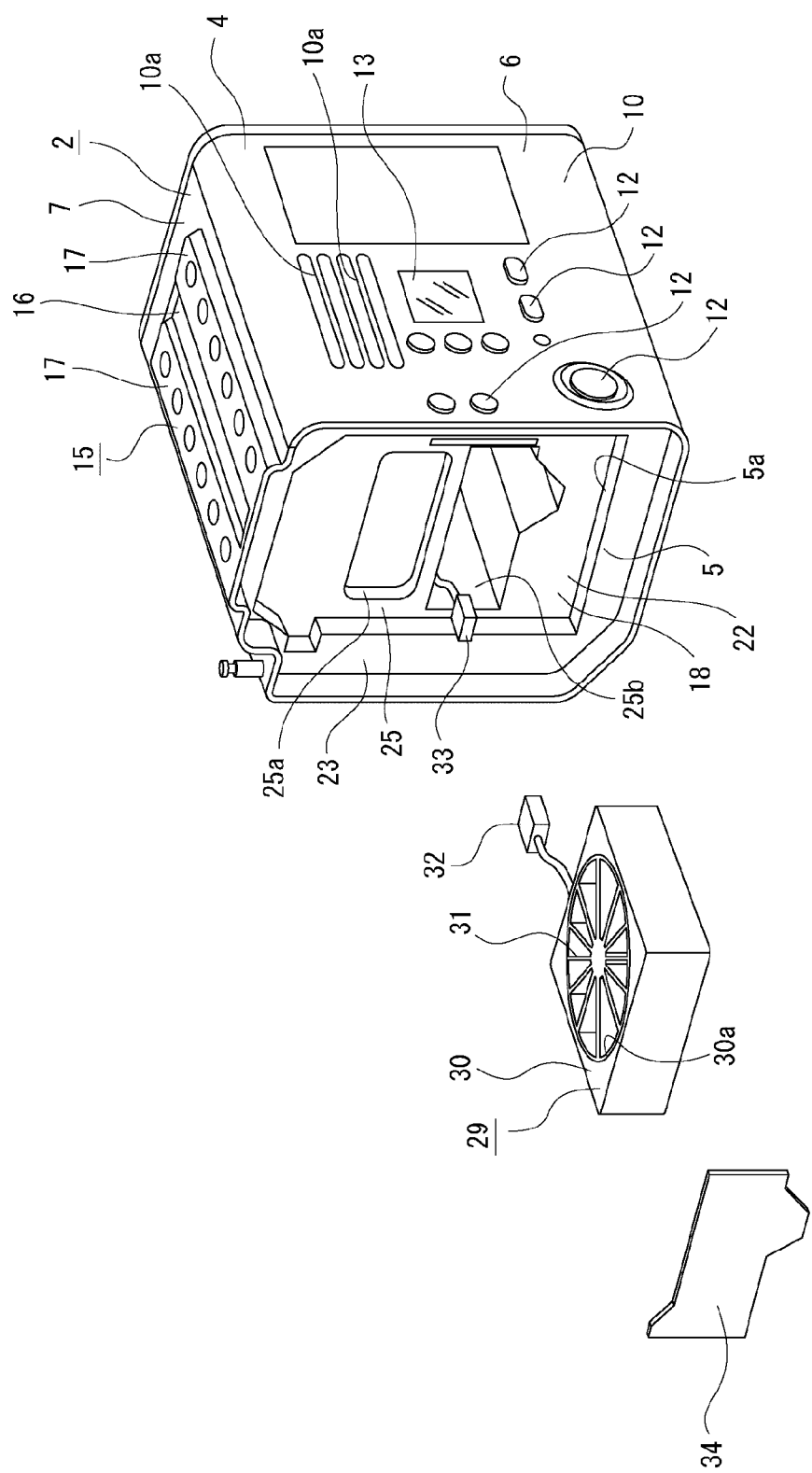
FIG. 8 is a perspective view of the apparatus body showing a state where a cooling fan is detached.

A cooling fan 29 is arranged inside the outer casing 5, and the cooling fan 29 is attachable to and detachable from the outer casing 5 (see FIGS. 6 to 8). The cooling fan 29 has a case part 30 that penetrates up and down, and a blade 31 that is rotated inside the case part 30, and a space inside the case part 30 is formed as a ventilation hole 30a. The cooling fan 29 is provided with a connector 32 led out from the case part 30.

The cooling fan 29 is configured to, for example, take in air from the upper side and cause the taken-in air to flow downward by rotation of the blade 31.

The cooling fan 29 can be put in and taken out inside and outside the outer casing 5 through the insertion hole 25b formed in the front surface plate 25 of the outer casing 5, and is held in a holding part (not shown) provided inside the outer casing 5 in a state where the whole is inserted into the outer casing 5 through the insertion hole 25b. When the cooling fan 29 is inserted through the insertion hole 25b, the connector 32 is connected to a connector terminal 33 provided inside the outer casing 5 so that a state is established where the cooling fan 29 can be supplied with power and the like. The connector terminal 33 is connected to one of the circuit boards as described later.

The cooling fan 29 is located directly below the heat radiation fins 28, 28, . . . joined to the side surface plate 19 in a state of being arranged inside the outer casing 5. In a state where the cooling fan 29 is arranged inside the outer casing 5, a fan cover 34 is attached to the front surface of the front surface plate 25 by screwing or the like, and the cooling fan 29 is covered by the fan cover 34. The fan cover 34 is formed in a plate shape that faces the front and rear direction.

Since the cooling fan 29 is covered by the fan cover 34 as described above, the cooling fan 29 can be taken out from the outer casing 5 by detaching the fan cover 34 from the front surface plate 25, and pulling out the cooling fan 29 from the insertion hole 25b.

Figure 9:
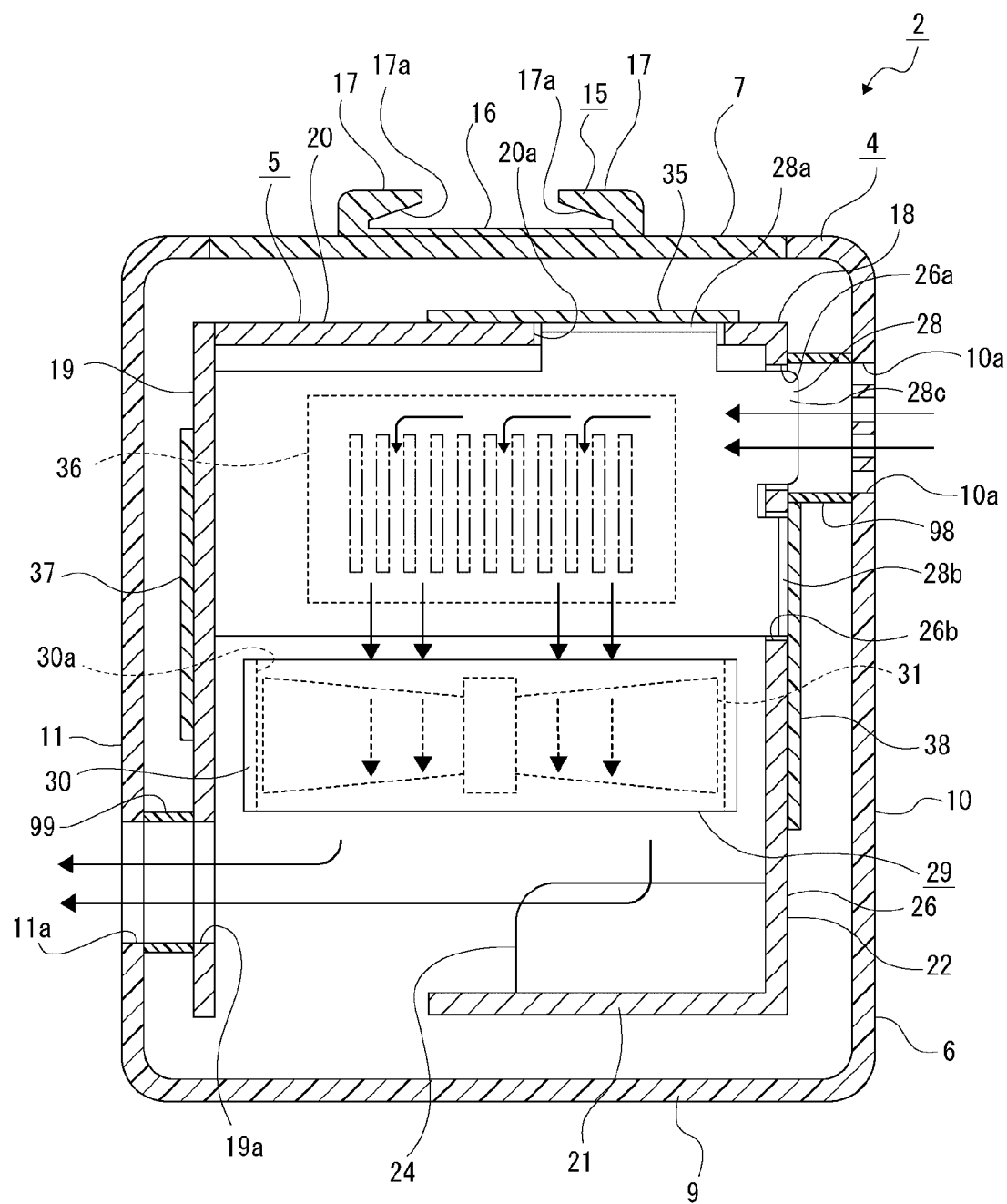
FIG. 9 is a cross-sectional view showing a cooling flow path for cooling air.
Figure 10:
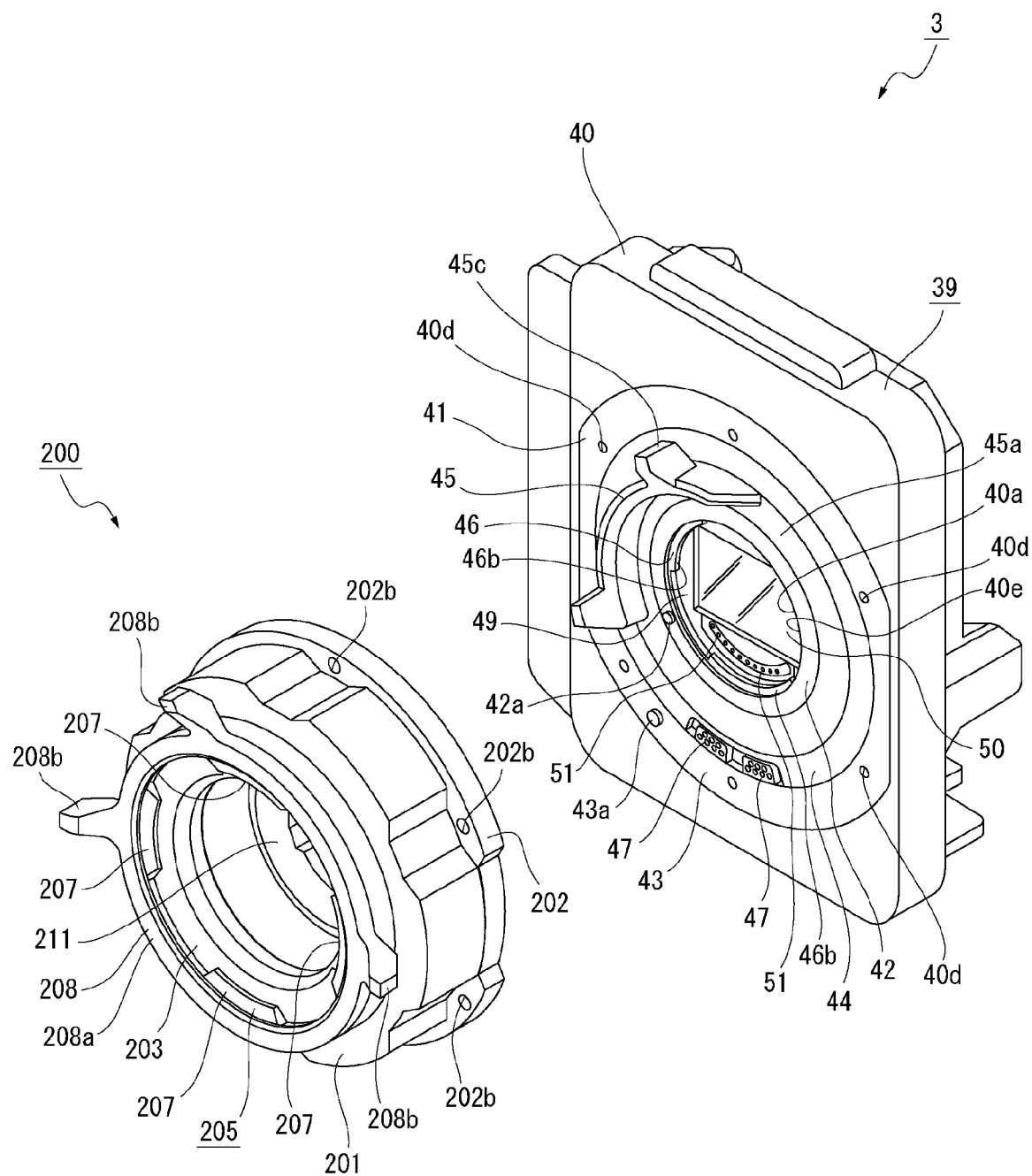
FIG. 10 is a perspective view of the imaging unit and the second accessory.
Figure 11:
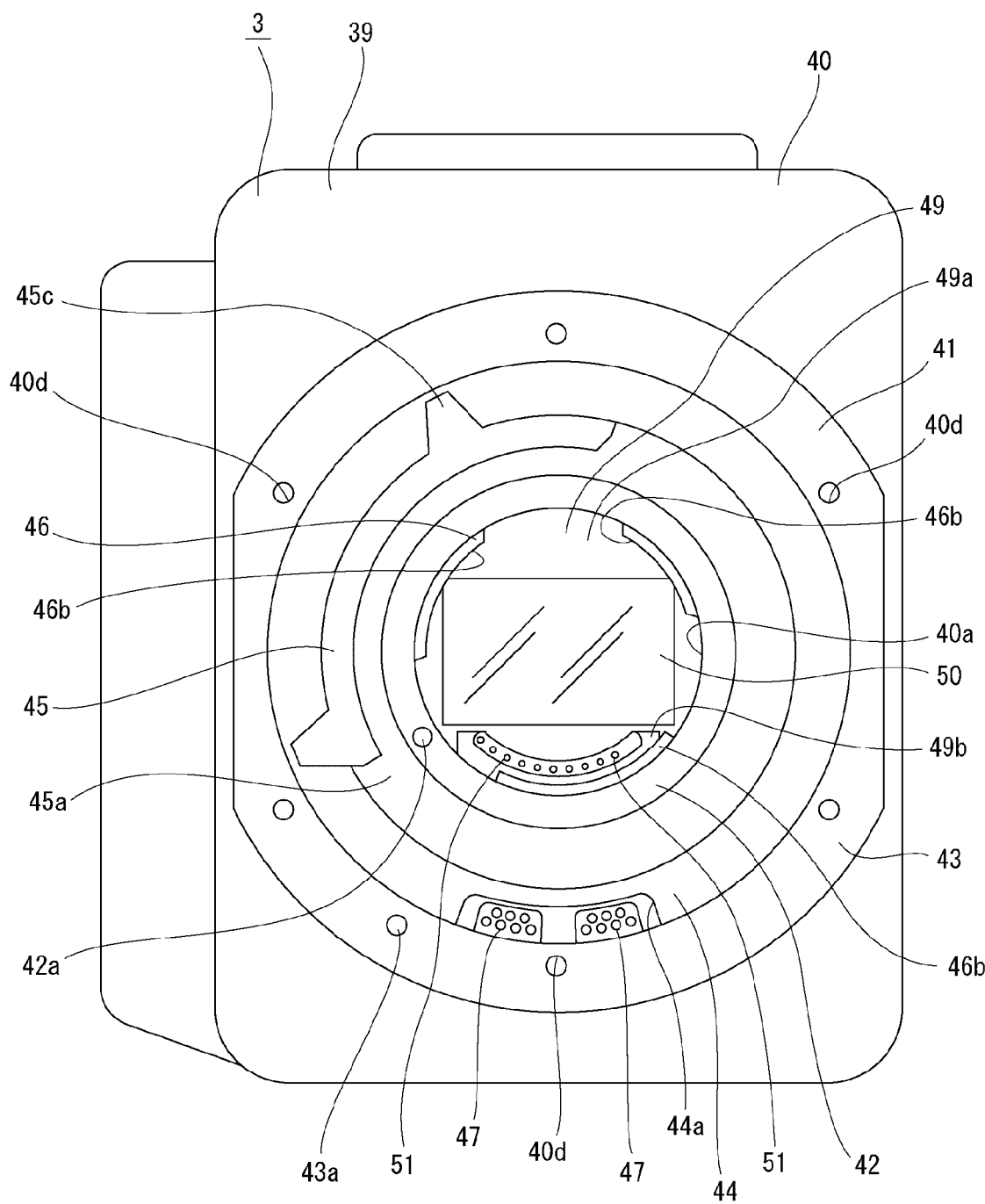
FIG. 11 is a front view of the imaging unit.

A first circuit board 35 is attached to the outer surface (upper surface) of the top surface plate 20 in the outer casing 5 (see FIGS. 6 and 9). The first joint parts 28a, 28a, . . . of the heat radiation fins 28, 28, . . . inserted through the insertion hole 20a are joined to the lower surface of the first circuit board 35. Note that the first circuit board 35 may be attached to an upper surface of a first heat transfer plate (not shown) attached to the top surface plate 20, the first joint parts 28a, 28a, . . . may be joined to the lower surface of the first heat transfer plate, and the first circuit board 35 may be joined to the heat radiation fins 28, 28, . . . through the first heat transfer plate.

A second circuit board 36 is attached to the outer surface (rear surface) of the rear surface plate 27 of the outer casing 5. Note that the second circuit board 36 may be attached to a rear surface of a second heat transfer plate (not shown) attached to the rear surface of the rear surface plate 27, the upper end portion of the second heat transfer plate and the rear end portion of the first heat transfer plate may be joined, and the second circuit board 36 may be joined to the heat radiation fins 28, 28, . . . through the second heat transfer plate and the first heat transfer plate.

A third circuit board 37 is attached above the exhaust holes 19a, 19a, . . . on the outer surface (right side surface) of the side surface plate 19 of the outer casing 5. Note that the third circuit board 37 may be attached to the right side surface of a third heat transfer plate (not shown) attached to the right side surface of the side surface plate 19, and the third circuit board 37 may be joined to the side surface plate 19 through the third heat transfer plate.

A fourth circuit board 38 is attached below the intake hole 26a on the outer surface (left side surface) of the side surface plate 26 of the outer casing 5. The second joint parts 28b, 28b, . . . of the heat radiation fins 28, 28, . . . inserted through the insertion hole 26b are joined to the right side surface of the fourth circuit board 38. Note that the fourth circuit board 38 may be attached to a left side surface of a fourth heat transfer plate (not shown) attached to the side surface plate 26, the second joint parts 28b, 28b, . . . may be joined to the right side surface of the fourth heat transfer plate, and the fourth circuit board 38 may be joined to the heat radiation fins 28, 28, . . . through the fourth heat transfer plate.

A first duct part 98 is arranged between the side surface part 10 of the outer panel 4 and the side surface plate 26 of the outer casing 5 (see FIG. 9). The first duct part 98 is formed in a tubular shape whose right and left direction is an axial direction, one end surface in the axial direction is bonded to a portion around the inflow holes 10a, 10a, . . . on the inner surface of the side surface part 10, and the other end surface in the axial direction is bonded to the portion around the intake hole 26a on the outer surface of the side surface plate 26.

Accordingly, the external air that has flowed in from the inflow holes 10a, 10a, . . . flows through a first duct part 98 from the intake hole 26a into the outer casing 5.

A second duct part 99 is arranged between the side surface part 11 of the outer panel 4 and the side surface plate 19 of the outer casing 5. The second duct part 99 is formed in a tubular shape whose right and left direction is an axial direction, one end surface in the axial direction is bonded to a portion around the outflow holes 11a, 11a, . . . on the inner surface of the side surface part 11, and the other end surface in the axial direction is bonded to the portion around the exhaust holes 19a, 19a, . . . on the outer surface of the side surface plate 19.

Accordingly, the air that has flowed inside the outer casing 5 flows out from the exhaust holes 19a, 19a, . . . through the second duct 99 and outflow holes 11a, 11a, . . . .

As described above, in the imaging apparatus 1, the first circuit board 35, the second circuit board 36, the third circuit board 37, and the fourth circuit board 38 are attached to the outer surface of the outer casing 5, and the inflow holes 10a, 10a, . . . , the intake hole 26a, the outflow holes 11a, 11a, . . . , and the exhaust holes 19a, 19a, . . . are spaced apart from the first circuit board 35, the second circuit board 36, the third circuit board 37, and the fourth circuit board 38 by the first duct part 98 and the second duct 99.

Accordingly, even in a case where rainwater, dust, or the like enters through the inflow holes 10a, 10a, . . . or the outflow holes 11a, 11a, . . . , the rainwater, dust, or the like that has entered is not adhered to the first circuit board 35, the second circuit board 36, the third circuit board 37, and the fourth circuit board 38, and it is possible to ensure a preferable operating state of the first circuit board 35, the second circuit board 36, the third circuit board 37, and the fourth circuit board 38.

Note that the first duct part 98 may be formed integrally with the side surface part 10 of the outer panel 4 or the side surface plate 26 of the outer casing 5, and the second duct 99 may be formed integrally with the side surface part 11 of the outer panel 4 or the side surface plate 19 of the outer casing 5.

In the apparatus body 2 configured as described above, when the cooling fan 29 is rotated, convection occurs as the cooling fan 29 rotates. When the cooling fan 29 is rotated, as shown by the arrow in FIG. 9, the external air is flowed from the inflow holes 10a, 10a, . . . formed in the side surface part 10 of the outer panel 4 to the inside of the outer panel 4 as cooling air, and the air that has flowed into is made to flow from the intake hole 26a formed in the side surface plate 26 of the outer casing 5 through the ventilation hole 30a of the cooling fan 29, is exhausted from the exhaust holes 19a, 19a, . . . formed in the side surface plate 19, and flows out to the outside from the outflow holes 11a, 11a, . . . formed in the side surface part 12 of the outer panel 4. Accordingly, the cooling flow path of the cooling air is a flow path, in order, from the inflow holes 10a, 10a, . . . through the intake hole 26a, the ventilation hole 30a, and the exhaust holes 19a, 19a, . . . and the outflow holes 11a, 11a, . . . .

At this time, the cooling air is made to flow from the intake hole 26a toward the cooling fan 29 along the heat radiation fins 28, 28, . . . , and flow from the cooling fan 29 toward the exhaust holes 19a, 19a, . . . along the heat radiation fins 24, 24.

A battery 500 is mounted on the rear surface of the apparatus body 2 (see FIGS. 1 and 2). The battery 500 has a function of supplying power to each part of the apparatus body 2 and the imaging unit 3.

The imaging unit 3 is configured by arranging required parts inside and outside a housing 39 (see FIGS. 10 to 13). The housing 39 has a front case part 40 formed in a thin box shape opened rearward and a rear case part as described later formed in a thin box shape opened forward.

A transmission hole 40a is formed in the center portion of the front case part 40 so as to penetrate therethrough in front and rear.

A part of the front surface of the front case part 40 is formed as a mount part 41 to which a first accessory and a second accessory as described later are selectively attached. In the mount part 41, a portion continuous to the transmission hole 40a is formed as an annular first mount surface 42. A part of the mount part 41 is formed as an annular second mount surface 43, and the second mount surface 43 is located on the outer circumferential side of the first mount surface 42 and spaced apart from the first mount surface 42. The first mount surface 42 and the second mount surface 43 are located on the same plane, and are formed in a concentric shape with the center of the transmission hole 40a as a reference.

The front case part 40 is provided with positioning pins 42a and 43a protruding forward on the first mount surface 42 and the second mount surface 43, respectively. Joint holes 40b and 40b are formed on the outer circumferential side of the first mount surface 42 in the front case part 40 so as to be spaced apart from each other in the circumferential direction, and the joint holes 40b and 40b are formed in an arc shape (see FIG. 12). A screw groove 40c is formed in a portion near the inner circumference of the front case part 40 (see FIG. 13). Screw holes 40d, 40d, . . . opened in the first mount surface 42 are formed in the front case part 40 so as to be spaced apart from each other in the circumferential direction. The inner circumferential surface of the front case part 40 is formed as a positioning part 40e.

On the front surface of the front case part 40, a decorative ring 44 is attached between the first mount surface 42 and the second mount surface 43 (see FIGS. 10 to 13). A notch 44a opened downward is formed at the lower end portion of the decorative ring 44 (see FIG. 12).

An annular attachment lever 45 is rotatably supported between the first mount surface 42 and the decorative ring 44 on the front surface of the front case part 40 (see FIGS. 10 to 13). The attachment lever 45 has an annular base part 45a, joint parts 45b and 45b protruding rearward from the base part 45a, and an operation protrusion 45c protruding forward from the base part 45a. The attachment lever 45 is supported by the front case part 40 in a state where the joint parts 45b and 45b are inserted through the joint holes 40b and 40b, respectively.

Figure 12:
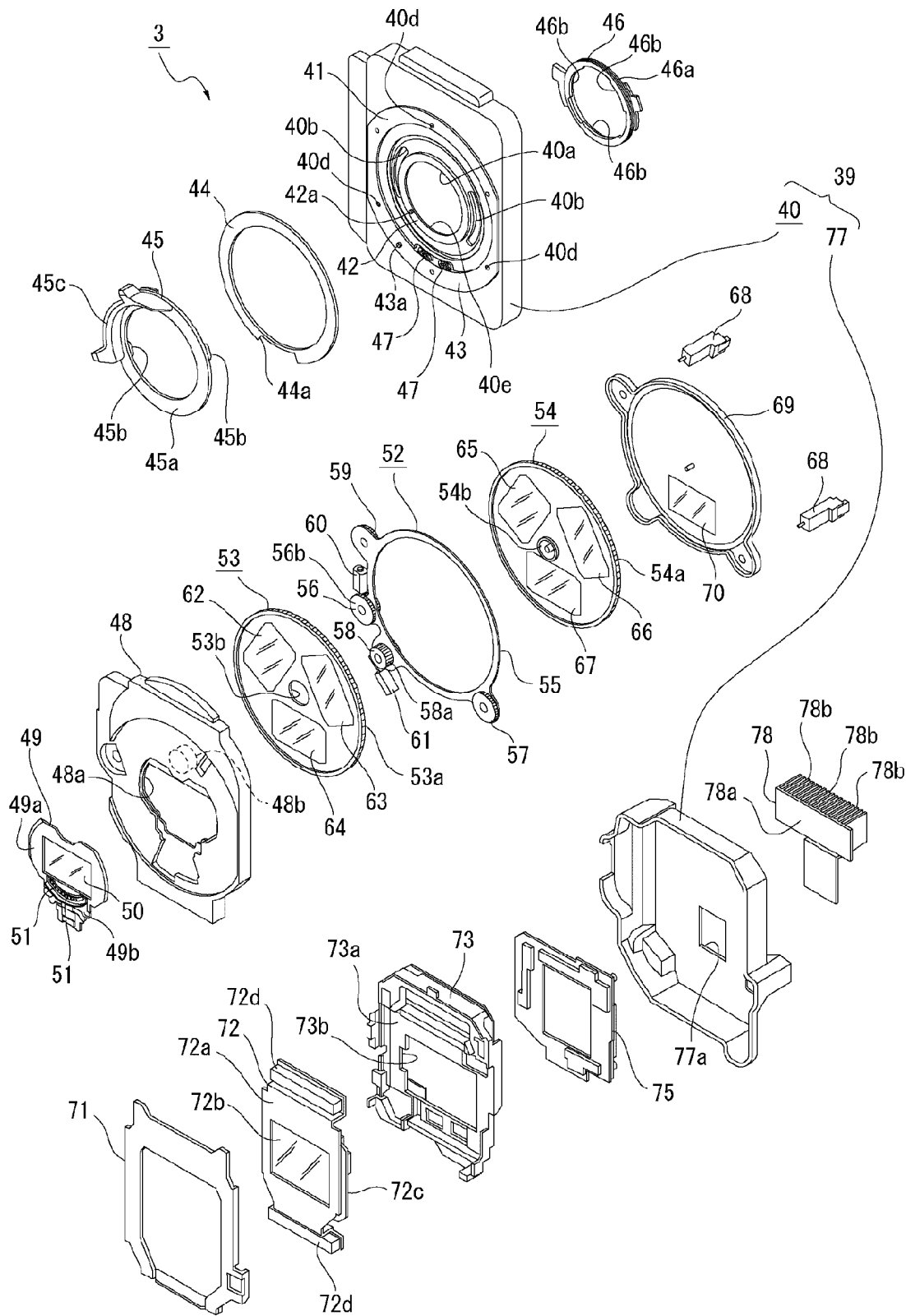
FIG. 12 is an exploded perspective view of the imaging unit.
Figure 13:
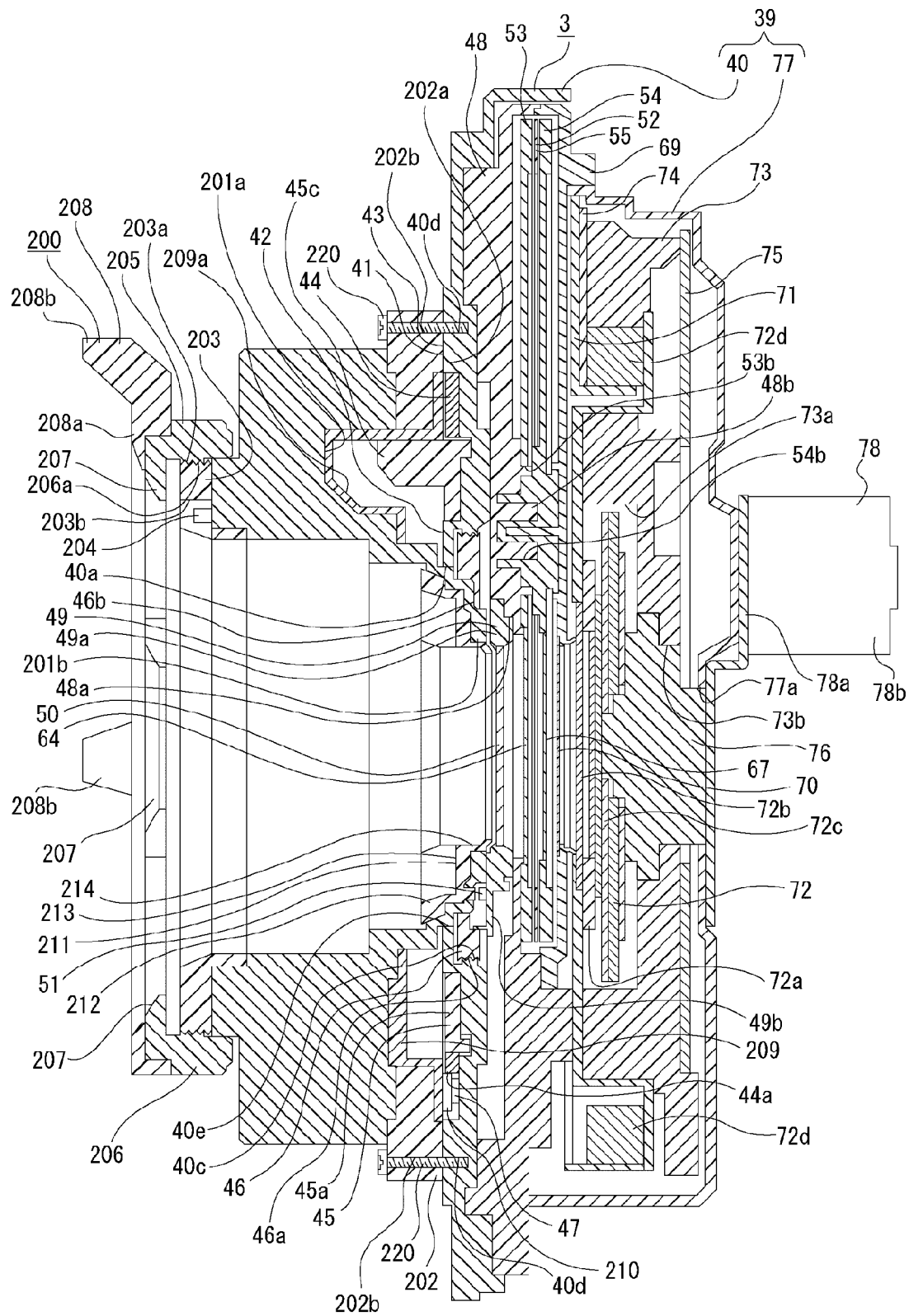
FIG. 13 is a cross-sectional view showing a state where the second accessory is attached to the imaging unit.

A joint ring 46 is rotatably supported on the rear surface side of the front case part 40 (see FIGS. 12 and 13). A screwing groove 46a is formed on the outer circumferential surface of the joint ring 46, and the screwing groove 46a is screwed into the screw groove 40c of the front case part 40. Engaging parts 46b, 46b, and 46b protruding inward are provided on the inner circumferential portion of the joint ring 46 so as to be spaced apart from each other in the circumferential direction.

The joint ring 46 is joined to the joint parts 45b and 45b of the attachment lever 45 inserted through the joint holes 40b and 40b. Accordingly, when the operation protrusion 45c is operated, the attachment lever 45 and the joint ring 46 are integrally rotated with respect to the front case part 40, the screwed position of the screwing groove 46a with respect to the screw groove 40c is changed in accordance with the rotation, and the attachment lever 45 and the joint ring 46 are integrally displaced in the front and rear direction with respect to the front case part 40.

In the front case part 40, contacts 47 and 47 are arranged and arrayed in the circumferential direction on the inner circumferential side of the second mount surface 43. The contacts 47 and 47 are located in the notch 44a of the decorative ring 44.

A filter holder 48 is arranged inside the front case part 40, and the filter holder 48 is attached to the inner surface of the front case part 40. The filter holder 48 is formed in a shallow case shape opened rearward, and has a through hole 48a that penetrates in front and rear. The filter holder 48 is provided with a support part 48b protruding rearward at a portion immediately above the through hole 48a.

A holding member 49 is attached to the filter holder 48. The holding member 49 has a frame-shaped holding part 49a and a contact arrangement part 49b protruding downward from the holding part 49a. The holding part 49a holds a substantially rectangular infrared cut filter 50, contacts 51, 51, . . . are arranged and arrayed in the circumferential direction in the contact arrangement part 49b.

The holding member 49 is attached to the filter holder 48 from the front side in a state where the holding part 49a covers the through hole 48a.

An intermediate ring 52, a first filter body 53, and a second filter body 54 are arranged on the rear side of the filter holder 48.

The intermediate ring 52 is located between the first filter body 53 and the second filter body 54 in the front and rear direction (optical axis direction), the first filter body 53 is located on the front side of the intermediate ring 52, and the second filter body 54 is located on the rear side of the intermediate ring 52 (see FIGS. 12 to 15).

The intermediate ring 52 has a substantially annular ring part 55, and a first drive gear 56, a first driven gear 57, a second drive gear 58, and a second driven gear 59 that are rotatably supported by the ring part 55. The second driven gear 59, the first drive gear 56, the second drive gear 58, and the first driven gear 57 are sequentially supported by the ring part 55 and spaced apart from each other in the circumferential direction.

The first drive gear 56 is a two-stage gear having a small diameter part 56*a* and a large diameter part 56*b*, the small diameter part 56*a* is supported on the rear surface side of the ring part 55, and the large diameter part 56*b* is supported on the front surface side of the ring part 55. The second drive gear 58 is a two-stage gear having a small diameter part 58*a* and a large diameter part 58*b*, the small diameter part 58*a* is supported on the front surface side of the ring part 55, and the large diameter part 58*b* is supported on the rear surface side of the ring part 55.

A first drive motor 60 and a second drive motor 61 are arranged inside the housing 39, the first drive motor 60 is provided with a worm 60*a*, and the second drive motor 61 is provided with a worm 61*a*.

The worm 60*a* of the first drive motor 60 meshes with the small diameter part 56*a* of the first drive gear 56. Accordingly, the first drive gear 56 is rotated in the direction corresponding to the rotation direction of the first drive motor 60. The worm 61*a* of the second drive motor 61 meshes with the small diameter part 58*a* of the second drive gear 58 (see FIG. 15). Accordingly, the second drive gear 58 is rotated in the direction corresponding to the rotation direction of the second drive motor 61.

Figure 14:
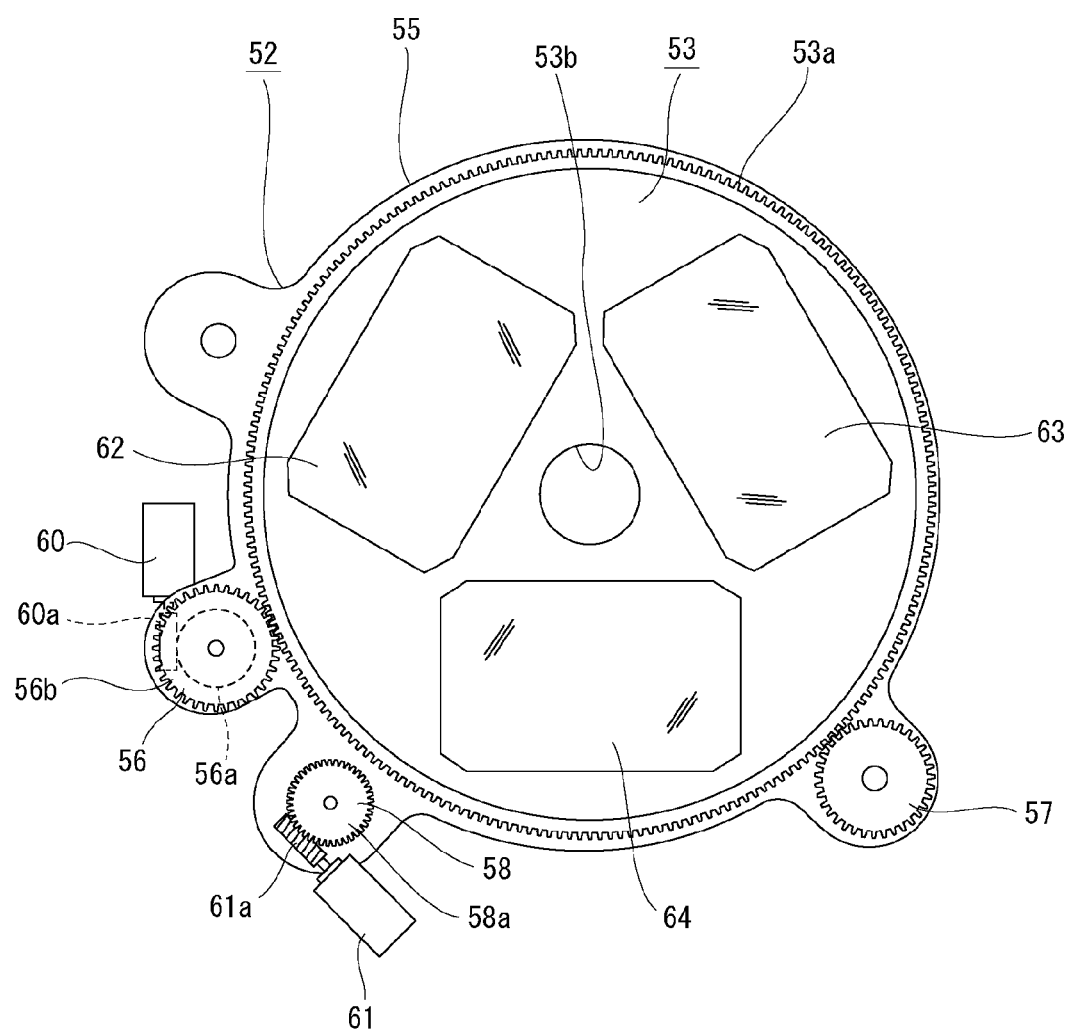
FIG. 14 is a front view showing a first filter body and an intermediate ring.

The first filter body 53 is formed in a substantially disc shape and has a gear part 53*a* on the outer circumferential surface (see FIGS. 12 and 14). A supported hole 53*b* penetrating in front and rear is formed in the center portion of the first filter body 53. In the first filter body 53, a first neutral density filter 62, a second neutral density filter 63, and a transparent plate 64, which are each formed in a substantially rectangular shape, are arranged. The first neutral density filter 62, the second neutral density filter 63, and the transparent plate 64 are located at equal intervals in the circumferential direction.

The first neutral density filter 62 and the second neutral density filter 63 are also called neutral density (ND) filters, and are neutral-density filters that reduce only the light amount without affecting the color development of an image. The first neutral density filter 62 has an optical density lower than that of the second neutral density filter 63, the first neutral density filter 62 has, for example, an optical density of 0.3, and the second neutral density filter 63 has, for example, an optical density of 0.6.

In the first filter body 53, the support part 48*b* is inserted into the supported hole 53*b* and the first filter body 53 is rotatably supported by the filter holder 48 (see FIG. 13). The gear part 53*a* of the first filter body 53 is meshed with the large diameter part 56*b* of the first drive gear 56 and the first driven gear 57, and the first filter body 53 is rotated with respect to the filter holder 48 in the direction corresponding to the rotation direction of the first drive motor 60 (see FIG. 14).

When the first filter body 53 is rotated, one of the first neutral density filter 62, the second neutral density filter 63, and the transparent plate 64 is located directly behind the infrared cut filter 50, and the degree of reduction of the light transmitted through the infrared cut filter 50 is changed according to the rotation position of the first filter body 53.

Figure 15:
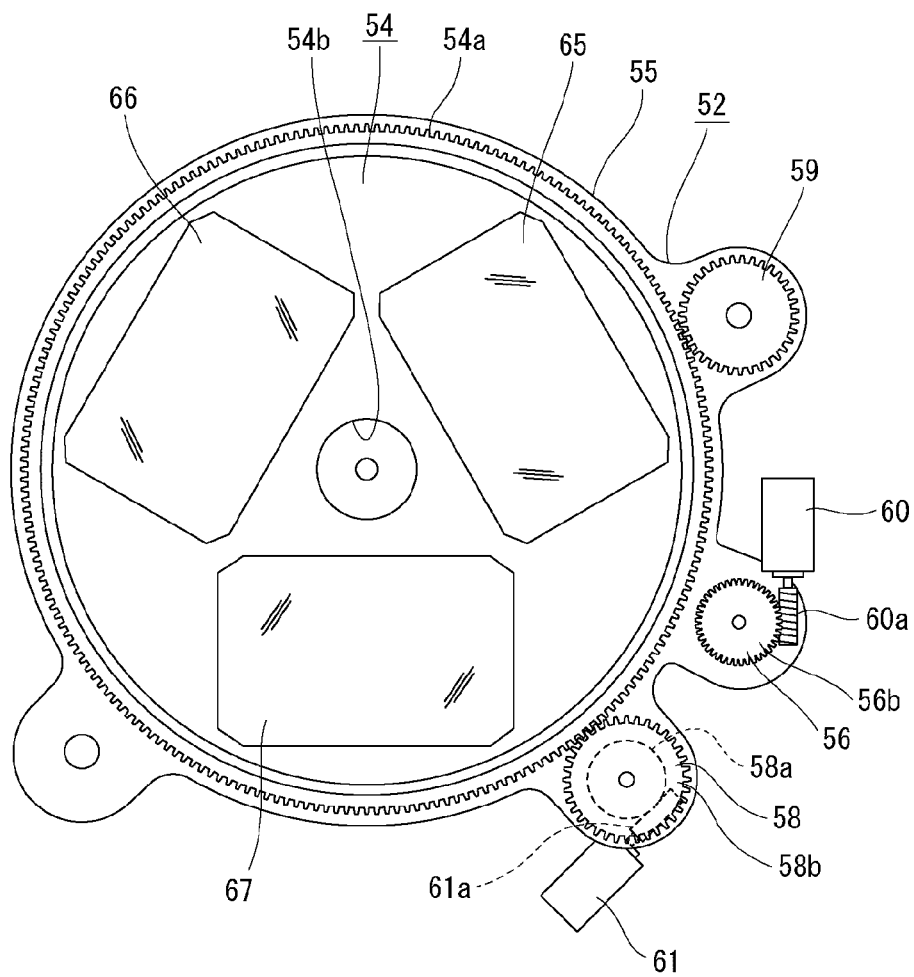
FIG. 15 is a rear view showing a second filter body and an intermediate ring.

The second filter body 54 is formed in a substantially disc shape and has a gear part 54*a* on the outer circumferential surface (see FIGS. 12 and 15). A supported recess 54*b* opened forward is formed in the center portion of the second filter body 54. In the second filter body 54, a third neutral density filter 65, a fourth neutral density filter 66, and a transparent plate 67, which are each formed in a substantially rectangular shape, are arranged. The third neutral density filter 65, the fourth neutral density filter 66, and the transparent plate 67 are located at equal intervals in the circumferential direction.

The third neutral density filter 65 and the fourth neutral density filter 66 are also called ND filters, and are neutral-density filters that reduce only the light amount without affecting the color development of an image. The third neutral density filter 65 has an optical density lower than that of the fourth neutral density filter 66, the third neutral density filter 65 has, for example, an optical density of 0.9, and the fourth neutral density filter 66 has, for example, an optical density of 1.8. Accordingly, the optical densities of the third neutral density filter 65 and the fourth neutral density filter 66 are made higher than the optical densities of the first neutral density filter 62 and the second neutral density filter 63.

In the second filter body 54, the support part 48*b* is inserted into the supported recess 54*b* and the second filter body 54 is rotatably supported by the filter holder 48 (see FIG. 13). The gear part 54*a* of the second filter body 54 is meshed with the large diameter part 58*b* of the second drive gear 58 and the second driven gear 59, and the second filter body 54 is rotated with respect to the filter holder 48 in the direction corresponding to the rotation direction of the second drive motor 61 (see FIG. 15).

When the second filter body 54 is rotated, one of the third neutral density filter 65, the fourth neutral density filter 66, and the transparent plate 67 is located directly behind the first neutral density filter 62, the second neutral density filter 63, or the transparent plate 64 located directly behind the infrared cut filter 50, and the degree of reduction of the light transmitted through the third neutral density filter 65, the fourth neutral density filter 66, or the transparent plate 67 is changed according to the rotation position of the second filter body 54.

Accordingly, in the imaging apparatus 1, since one of the third neutral density filter 65, the fourth neutral density filter 66, and the transparent plate 67 is located in the incident path of light (on the optical axis) with respect to one of the first neutral density filter 62, the second neutral density filter 63, and the transparent plate 64, it is possible to set nine kinds of degree of light reduction of combination of the first neutral density filter 62, the second neutral density filter 63, and the transparent plate 64 with the third neutral density filter 65, the fourth neutral density filter 66, and the transparent plate 67.

Rotation detection sensors 68 and 68 are arranged inside the housing 39 on the outer circumferential side of the intermediate ring 52 (see FIG. 12). The rotation detection sensors 68 and 68 detect the rotation positions of the first filter body 53 and the second filter body 54.

A rear cover 69 is attached to the filter holder 48 from the rear (see FIGS. 12 and 13). The rear cover 69 is formed in a shallow case shape opened forward, and is attached to the filter holder 48 so as to cover the intermediate ring 52, the first filter body 53, and the second filter body 54 from rear. A substantially rectangular low pass filter 70 is held at a position near the lower end of the rear cover 69. The low pass filter 70 blocks high-frequency components of light.

An element holder 71 is arranged behind the rear cover 69. The element holder 71 is formed in a substantially rectangular frame shape.

The element holder 71 holds the element unit 72. The element unit 72 has: a plate-shaped holding base 72*a* that is oriented substantially in the front and rear direction; an imaging element 72b held by the holding base 72a; an element control board 72c that controls the imaging element 72b; and bonding parts 72d and 72d attached to the upper and lower end portions of the holding base 72a. As the imaging element 72b, for example, a charged coupled device (CCD), a complementary metal-oxide semiconductor (CMOS), or the like is used. The imaging element 72b is mounted on the front surface of the element control board 72c.

The element unit 72 is held by the element holder 71 by joining the bonding parts 72d and 72d to the upper and lower end portions of the element holder 71, respectively.

A board holder 73 is arranged behind the element holder 71. The board holder 73 is formed by, for example, a metal material having high thermal conductivity into a substantially rectangular frame shape, and has an arrangement recess 73a opened forward. The board holder 73 is formed with an attachment hole 73b that communicates with the arrangement recess 73a.

The board holder 73 is attached to the element holder 71, and the imaging element 72b and the element control board 72c are arranged in the arrangement recess 73a in a state where the board holder 73 is attached to the element holder 71.

A first control board 74 is attached to the upper end portion of the board holder 73 (see FIG. 13). On the first control board 74, for example, a control circuit that controls driving of the first drive motor 60 and the second drive motor 61 is formed.

A second control board 75 is attached to the rear surface of the board holder 73 (see FIGS. 12 and 13). The second control board 75 functions as a relay substrate that transmits and receives signals between the imaging unit 3 and the apparatus body 2, for example, in a state where the imaging unit 3 is attached to the apparatus body 2.

A heat transfer member 76 is attached to the board holder 73 while being inserted into the attachment hole 73b (see FIG. 13). A front end portion of the heat transfer member 76 is joined to the element control board 72c.

The housing 39 has the front case part 40 and the rear case part 77 as described above (see FIGS. 10, 12, and 13). The rear case part 77 is formed in a thin box shape opened forward.

An insertion hole 77a is formed in the center portion of the rear case part 77 so as to penetrate therethrough in front and rear. The rear case part 77 is joined to the rear cover 69 and the filter holder 48 from rear. In a state where the rear case part 77 is joined to the rear cover 69 and the filter holder 48, the rear case part 77 covers the element holder 71, the element unit 72, the board holder 73, the first control board 74, and the second control board 75.

The rear end portion of the heat transfer member 76 is inserted into the insertion hole 77a of the rear case part 77.

A fin unit 78 is attached to the rear surface of the rear case part 77 (see FIGS. 12 and 13). The fin unit 78 has an attachment plate 78a attached to the rear surface of the rear case part 77 and heat radiation fins 78b, 78b, . . . attached to the rear surface of the attachment plate 78a, and the heat radiation fins 78b, 78b, . . . are spaced apart from each other in right and left. The attachment plate 78a is attached to the rear surface of the rear case part 77 in a state where a part of the attachment plate 78a covers the insertion hole 77a of the rear case part 77 from the rear side, and the rear surface of the heat transfer member 76 is bonded to the front surface.

As described above, the heat transfer member 76 has a front end portion bonded to the element control board 72c and a rear end portion bonded to the attachment plate 78a of the fin unit 78. Accordingly, the heat generated in the element unit 72 is transferred to the fin unit 78 via the heat transfer member 76 and is discharged from the heat radiation fins 78b, 78b, . . . .

Furthermore, since the board holder 73 is formed by a metal material having high thermal conductivity and the heat transfer member 76 is attached to the board holder 73, the heat generated in the first control board 74 and the second control board 75 each attached to the board holder 73 is transferred to the fin unit 78 via the board holder 73 and the heat transfer member 76, and is discharged from the heat radiation fins 78b, 78b, . . . .

As described above, in the imaging apparatus 1, the first filter body 53 and the second filter body 54 that reduce the amount of light toward the imaging element 72b are provided, and the first filter body 53 and the imaging element 72b are located on the opposite side across the second filter body 54, and the first neutral density filter 62 having the lowest optical density is provided in the first filter body 53.

Generally, in a neutral density filter, the higher the optical density is, the more easily so-called "burning" occurs when light is incident, which may cause deterioration, so that the first neutral density filter 62 having the lowest optical density is provided in the first filter body 53 located closer to the object side than the second filter body 54, and thereby, burning is less likely to occur in the first neutral density filter 62 and the second neutral density filter 63 provided in the first filter body 53, and it is possible to suppress deterioration of the first neutral density filter 62 and the second neutral density filter 63.

Furthermore, since it is more likely that the light is transmitted through the first neutral density filter 62 or the second neutral density filter 63 of the first filter body 53 and incident on the third neutral density filter 65 or the fourth neutral density filter 66 of the second filter body 54, the light of which the light amount is reduced by the first neutral density filter 62 or the second neutral density filter 63 easily enters the third neutral density filter 65 or the fourth neutral density filter 66. Accordingly, burning is less likely to occur in the third neutral density filter 65 and the fourth neutral density filter 66 provided in the second filter body 54, and it is also possible to suppress deterioration of the third neutral density filter 65 and the fourth neutral density filter 66.

Moreover, since the infrared cut filter 50 is arranged on the opposite side of the second filter body 54 across the first filter body 53, the light transmitted through the infrared cut filter 50 is incident on the first neutral density filter 62, the second neutral density filter 63, the third neutral density filter 65, and the fourth neutral density filter 66.

Accordingly, it is possible to suppress the temperature rise of the first neutral density filter 62, the second neutral density filter 63, the third neutral density filter 65, and the fourth neutral density filter 66 to ensure preferable performance of the first neutral density filter 62, the second neutral density filter 63, the third neutral density filter 65, and the fourth neutral density filter 66.

Moreover, each of the first filter body 53 and the second filter body 54 is rotatable, and the first neutral density filter 62, the second neutral density filter 63, the third neutral density filter 65, and the fourth neutral density filter 66 having different optical densities and spaced apart in the circumferential direction are provided in the first filter body 53 and the second filter body 54.

Accordingly, by rotating the first filter body 53 and the second filter body 54, the number of combinations of neutral density filters having different optical densities increases, and the degree of freedom regarding the reduction amount of the light toward the imaging element 72b increases, so that it is possible to diversify the capturing mode.

The imaging unit 3 configured as described above is attachable to and detachable from the outer casing 5 of the apparatus body 2 as described above (see FIGS. 3 and 4). The imaging unit 3 is attached to the outer casing 5 by inserting at least a part of the imaging unit 3, from the front side, to the arrangement space 5a formed in the front end portion of the outer casing 5 in a state where the cooling fan 29 is arranged inside the outer casing 5, and fixing the imaging unit 3 to the front surface plate 25 or the frame surface part 23 by screwing or the like.

In the state where the imaging unit 3 is attached to the outer casing 5, the heat radiation fins 78b, 78b, . . . of the fin unit 78 are inserted from the fin insertion hole 25a of the front surface plate 25 and located inside the outer casing 5 (see FIG. 9). The heat radiation fins 78b, 78b, . . . are located in the cooling flow path of cooling air from the inflow holes 10a, 10a, . . . through the intake hole 26a, the ventilation hole 30a, and the exhaust holes 19a, 19a, . . . and the outflow holes 11a, 11a, . . . .

Figure 16:
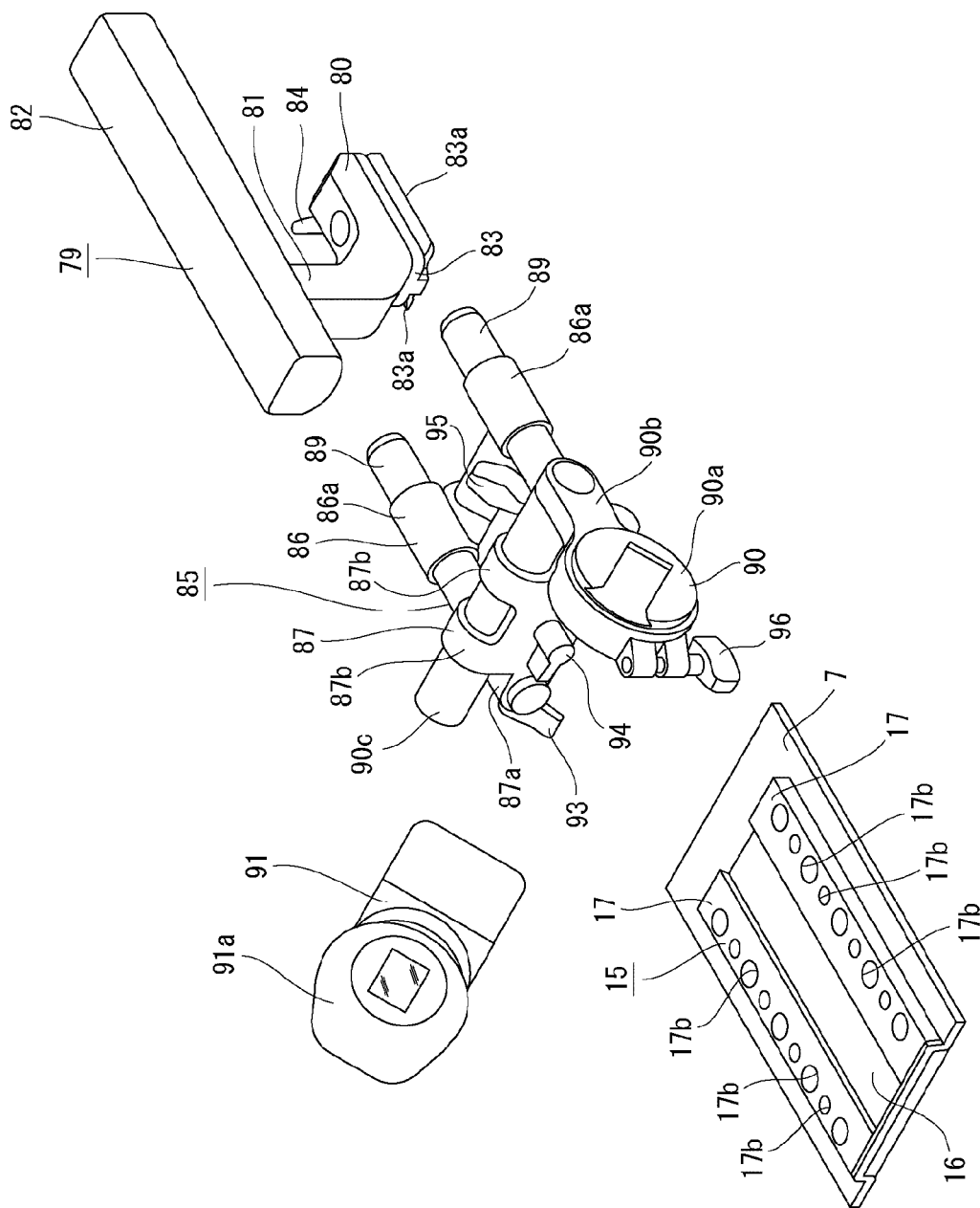
Figure 17:
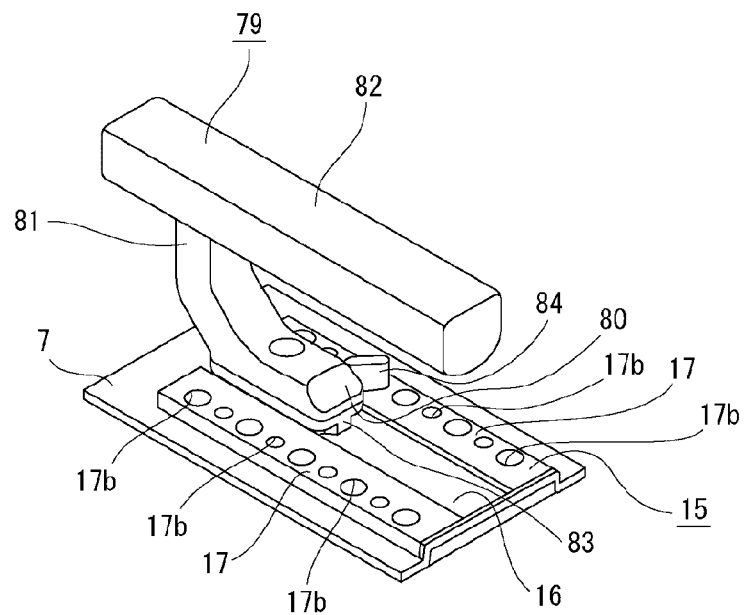
FIG. 17 is a perspective view showing a state where the handle is attached to an adjustment table.
Figure 18:
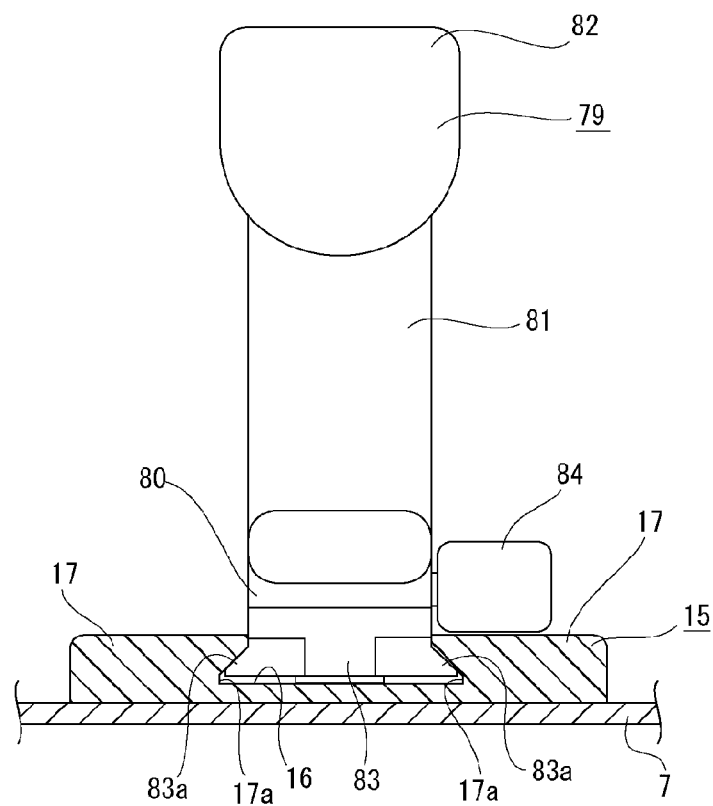
FIG. 18 is a front view showing a state where the handle is attached to the adjustment table in a partial cross section.

A handle 79 is attachable to and detachable from the adjustment table 15 attached to the upper surface of the upper panel part 7 of the outer panel 4 (see FIGS. 16 to 18). The handle 79 has a base table part 80 extending in front and rear, a coupling part 81 protruding upward from one end portion in the longitudinal direction of the base table part 80, and a handle part 82 continuous to the upper end portion of the coupling part 81 and extending in the same direction as the base table part 80.

A supported plate 83 is attachable to and detachable from the lower surface of the base table part 80. The right and left end portions of the supported plate 83 are provided as guided parts 83a and 83a protruding in opposite directions. A lock lever 84 is supported on the base table part 80.

In the handle 79, the guided parts 83a and 83a of the supported plate 83 are inserted into the slide grooves 17a and 17a of the adjustment table 15 and slid on the adjustment parts 17 and 17, respectively, so that the handle 79 is slidable in the front and rear direction with respect to the adjustment table 15. Accordingly, by moving the handle 79 in the front and rear direction with respect to the adjustment table 15, the handle 79 can be attached to the adjustment table 15 at a desired position. In a state where the handle 79 is moved in the front and rear direction with respect to the adjustment table 15, the lock lever 84 is operated to lock the handle 79 at the position moved with respect to the adjustment table 15.

Since the handle 79 is movable in the front and rear direction with respect to the adjustment table 15 as described above, it is possible to attach the handle 79 in the most balanced position in a state where the handle 79 is gripped in consideration of the center of gravity of the entire body when the imaging apparatus 1 is used, and perform stable capturing.

Figure 19:
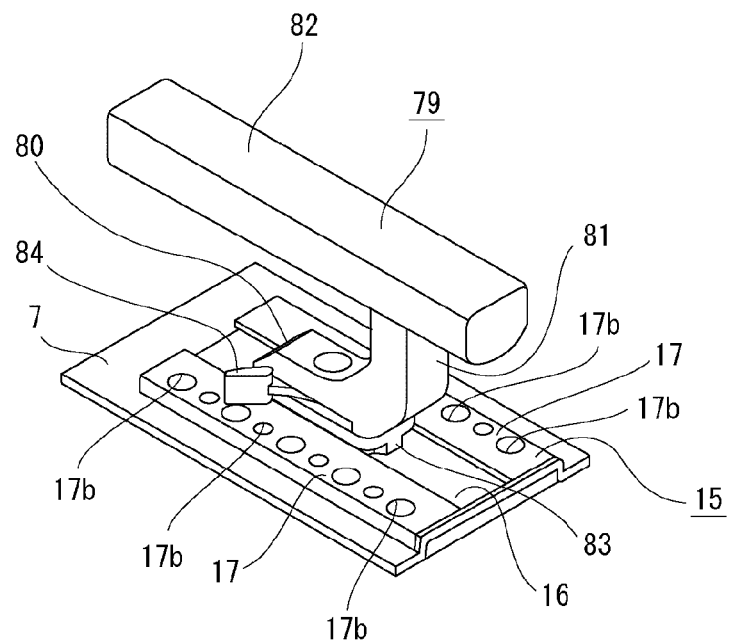
FIG. 19 is a perspective view showing a state where the handle is attached to the adjustment table in the opposite direction to that of FIG. 17.

Furthermore, the handle 79 can be slid on the adjustment parts 17 and 17 by inserting the guided parts 83a and 83a into the slide grooves 17a and 17a with the direction of the handle 79 reversed (see FIG. 19). Accordingly, by setting the handle 79 so that it can be easily gripped, it is possible to ensure a preferable capturing state.

Figure 20:
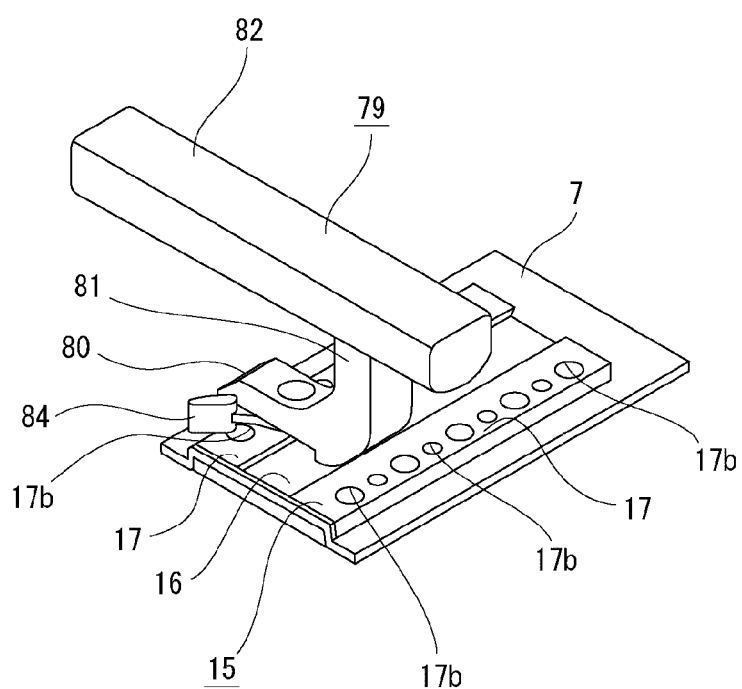
FIG. 20 is a perspective view showing a state where the handle is attached to the adjustment table in a direction different from those in FIGS. 17 and 19.

Moreover, the handle 79 can be attached to the adjustment table 15 in a direction such that the base table part 80 and the handle part 82 extend in the right and left direction (see FIG. 20). In this case, the supported plate 83 is detached from the base table part 80, and an attachment screw (not shown) is screwed into a desired adjustment screw hole 17b to attach the base table part 80 to one adjustment part 17.

Since the handle 79 can be attached to the adjustment table 15 in such orientation that the handle part 82 extends in the right and left direction as described above, the degree of freedom in the orientation of the handle 79 with respect to the adjustment table 15 is increased, and by setting the handle 79 in such orientation that the handle 79 is easily gripped, it is possible to ensure a more preferable capturing state.

Figure 21:
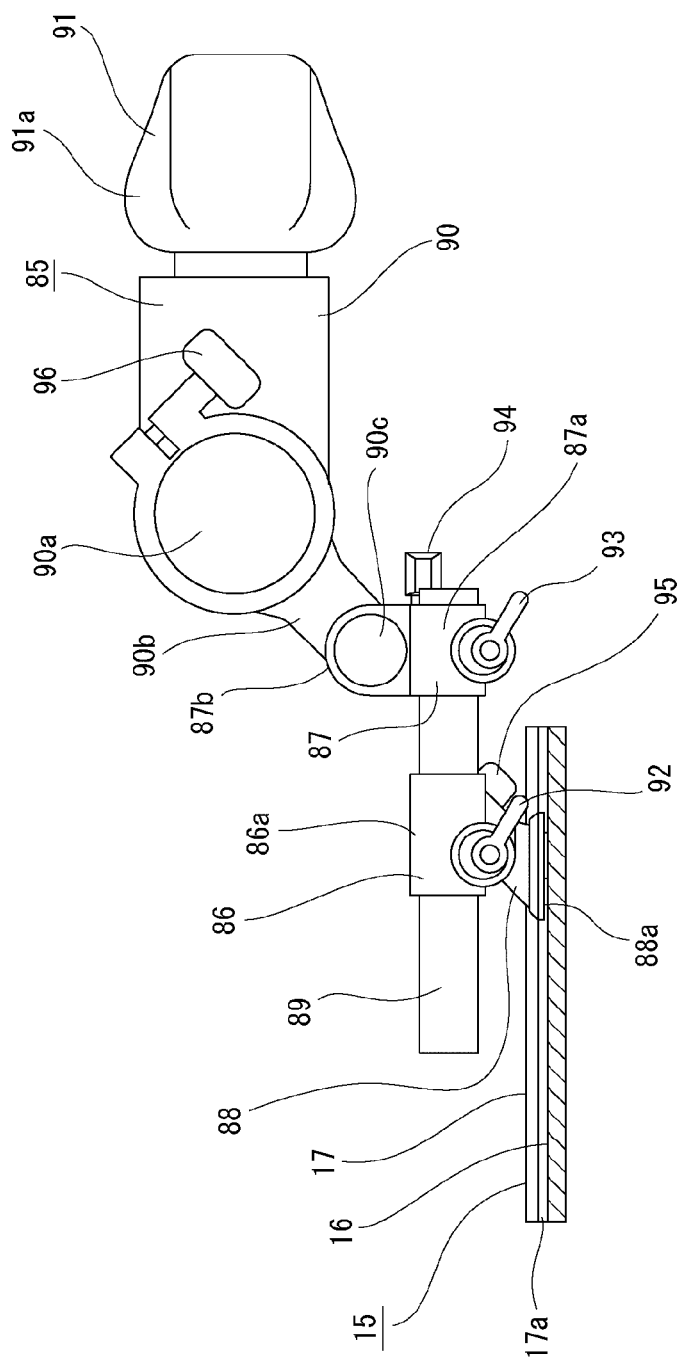
FIG. 21 is a side view showing a state where a finder unit is attached to the adjustment table with a part in section.

In addition to the handle 79, a finder unit 85 is also attachable to and detachable from the adjustment table 15 (see FIGS. 16 and 21). The finder unit 85 has axis holders 86 and 87, a guided member 88, support axes 89 and 89, a rotation arm 90, and a view body 91.

The axis holder 86 has right and left coupled cylindrical support tubular parts 86a and 86a. The axis holder 86 supports a first lock lever 92.

The axis holder 87 has right and left coupled cylindrical support tubular parts 87a and 87a, and cylindrical coupling tubular parts 87b and 87b located above the support tubular parts 87a and 87a. The axial direction of the coupling tubular parts 87b and 87b is set to be a direction orthogonal to the axial direction of the support tubular parts 87a and 87a. The axis holder 87 supports a second lock lever 93 on the lower side and a third lock lever 94 on the upper side.

The guided member 88 is coupled to the lower side of the axis holder 86. The right and left end portions of the guided member 88 are provided as guided parts 88a and 88a protruding in opposite directions. The guided member 88 supports a fourth lock lever 95.

The support axes 89 and 89 are inserted into the axis holders 86 and 87 in a state of being parallel to right and left. The support axis 89 is inserted through the support tubular part 86a of the axis holder 86 and the support tubular part 87a of the axis holder 87, and is slidable in the axis holders 86 and 87 in the axial direction (front and rear direction).

In a state where the support axes 89 and 89 are slid with respect to the axis holder 86, the support axes 89 and 89 are locked to the axis holder 86 by operating the first lock lever 92. Furthermore, in a state where the support axes 89 and 89 are slid with respect to the axis holder 87, the support axes 89 and 89 are locked to the axis holder 87 by operating the second lock lever 93.

The rotation arm 90 includes a rotation fulcrum part 90a that is coupled to the view body 91 so as to be rotatable with each other, an arm part 90b protruding from the rotation fulcrum part 90a, and a coupling axis part 90c protruding from the arm part 90b. The protruding direction of the coupling axis part 90c from the arm part 90b is orthogonal to the protruding direction of the arm part 90b from the rotation fulcrum part 90a. The rotation fulcrum part 90a of the rotation arm 90 supports a fifth lock lever 96.

In the rotation arm 90, the coupling axis part 90c is inserted into the coupling tubular parts 87b and 87b of the axis holder 87, and the coupling axis part 90c is slidable in the axis holder 87 in the axial direction (right and left direction). In a state where the coupling axis part 90c is slid with respect to the axis holder 87, the coupling axis part 90c is locked to the axis holder 87 by operating the third lock lever 94. Furthermore, the coupling axis part 90c is rotatable in the axis holder 87 in the direction around the axis, and by operating the third lock lever 94 in a state where the coupling axis part 90c is rotated with respect to the axis holder 87, the coupling axis part 90c is locked to the axis holder 87.

The rotation arm 90 has a rotation fulcrum part 90a rotatably coupled to the view body 91, and by operating the fifth lock lever 96 in a state where the rotation arm 90 or the view body 91 is rotated, the rotation arm 90 is locked to the view body 91.

The view body 91 has one end portion provided as a finder part 91a and the other end portion provided with a coupling fulcrum part 91b coupled to the rotation fulcrum part 90a.

In the finder unit 85, the guided parts 88a and 88a of the guided member 88 are inserted into the slide grooves 17a and 17a of the adjustment table 15 and slid on the adjustment parts 17 and 17, respectively, so that the finder unit 85 is slidable in the front and rear direction with respect to the adjustment table 15. Accordingly, by moving the finder unit 85 in the front and rear direction with respect to the adjustment table 15, the finder unit 85 can be attached to the adjustment table 15 at a desired position. In a state where the finder unit 85 is moved in the front and rear direction with respect to the adjustment table 15, the fourth lock lever 95 is operated to lock the finder unit 85 at the position moved with respect to the adjustment table 15.

Since the finder unit 85 is movable in the front and rear direction with respect to the adjustment table 15 as described above, it is possible to attach the finder unit 85 to the most balanced position in consideration of the center of gravity of the entire body when the imaging apparatus 1 is used, and perform stable capturing.

Furthermore, the finder unit 85 can be slid on the adjustment parts 17 and 17 by inserting the guided parts 88a and 88a into the slide grooves 17a and 17a with the direction reversed. Accordingly, by setting the finder unit 85 so that the finder unit 85 can be easily viewed, it is possible to ensure a preferable capturing state.

Moreover, in the finder unit 85, it is possible to move the support axes 89 and 89 with respect to the axis holders 86 and 87, and by setting the position of the finder part 91a to a desired position, it is possible to ensure a more preferable capturing state.

Moreover, in the finder unit 85, the coupling axis part 90c can be rotated around the axis with respect to the axis holder 87, and the rotation fulcrum part 90a is coupled to the view body 91 so as to be rotatable with each other.

Figure 22:
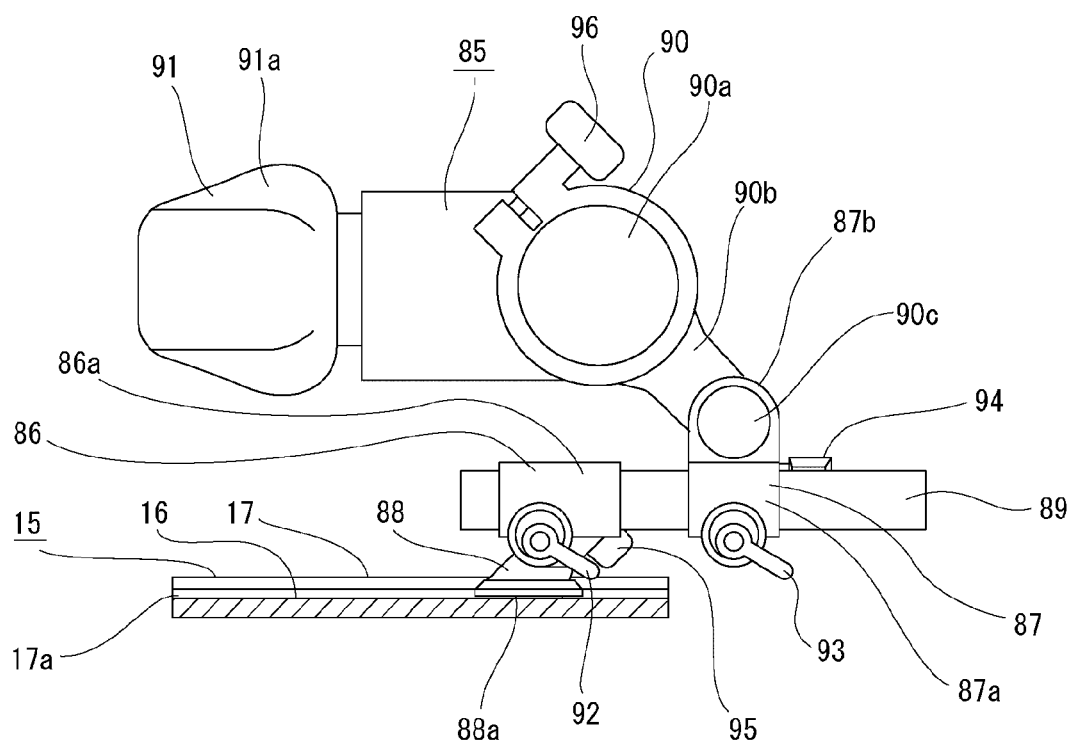
FIG. 22 is a side view showing, with a part in section, a state where a view body is rotated so that a finder part is oriented differently from that in FIG. 21.
Figure 23:
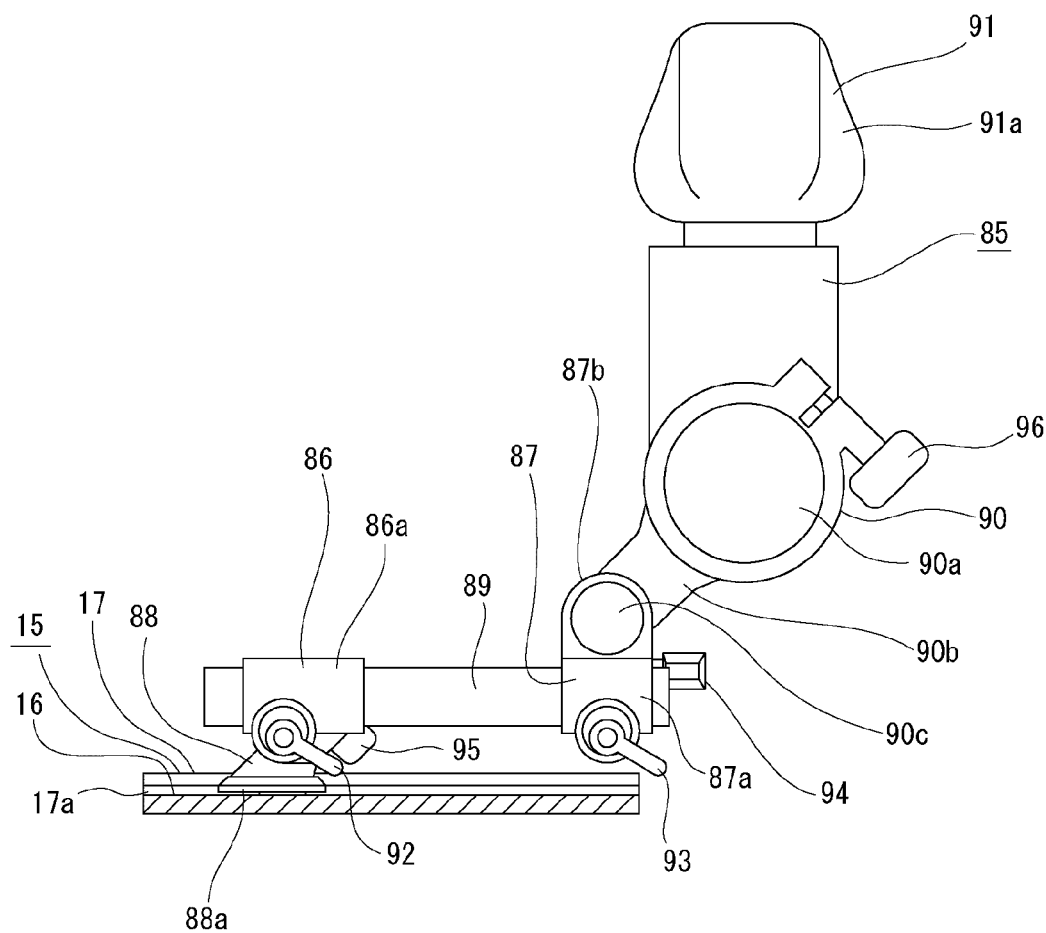
FIG. 23 is a side view showing, with a part in section, a state where a view body is rotated so that a finder part is oriented differently from those in FIGS. 21 and 22.

Accordingly, it is possible to adjust the finder part 91a of the view body 91 in a desired orientation for use, and ensure a more preferable capturing state (see FIGS. 22 and 23).

Figure 24:
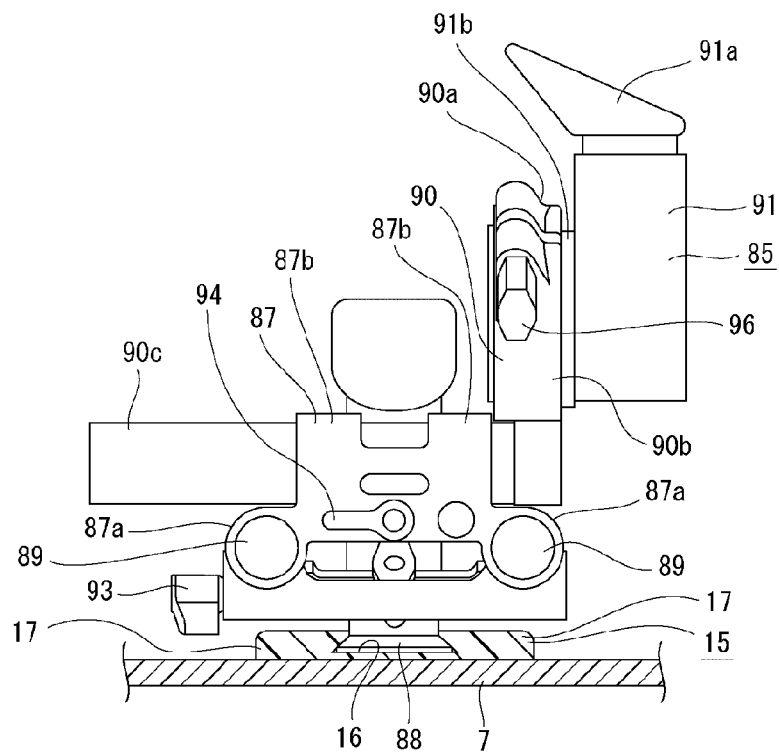
FIG. 24 is a front view showing a state where the finder unit is attached to the adjustment table with a part in section.
Figure 25:
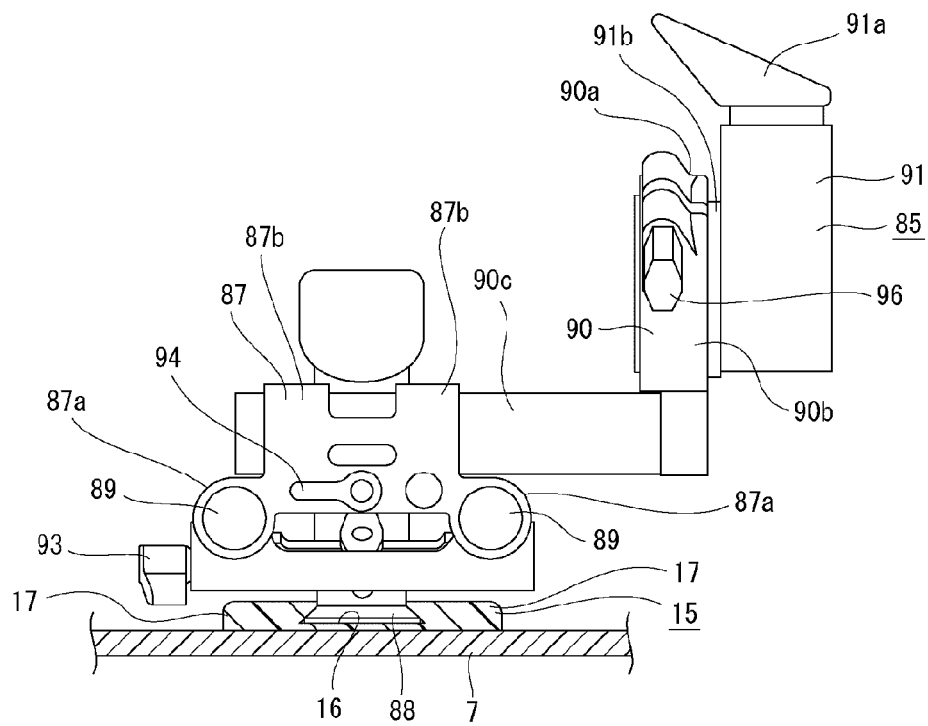
FIG. 25 is a front view showing a state where a coupling axis part is moved in a state where the finder unit is attached to the adjustment table, with a part in section.
Figure 26:
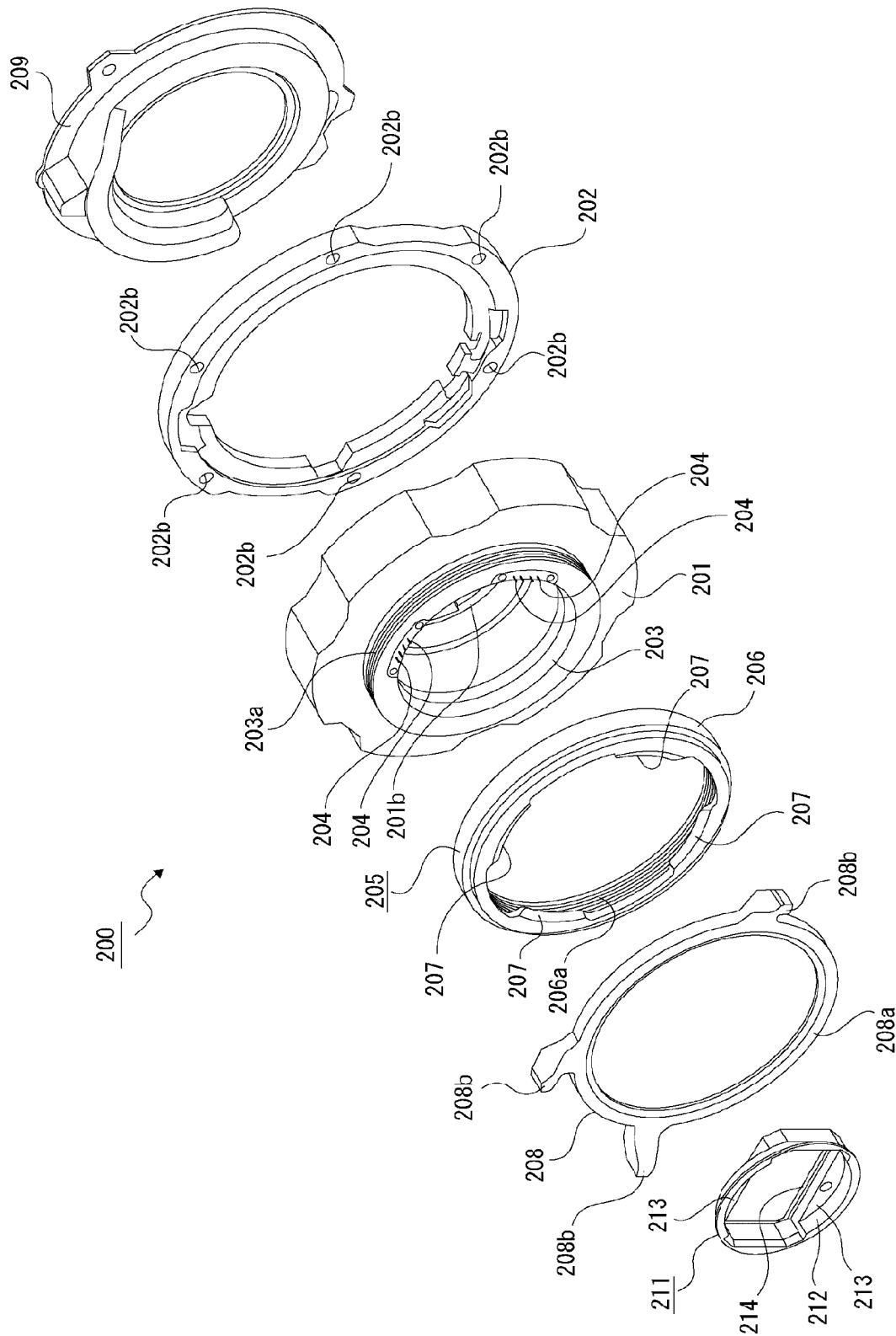
FIG. 26 is an exploded perspective view of the second accessory.
Figure 27:
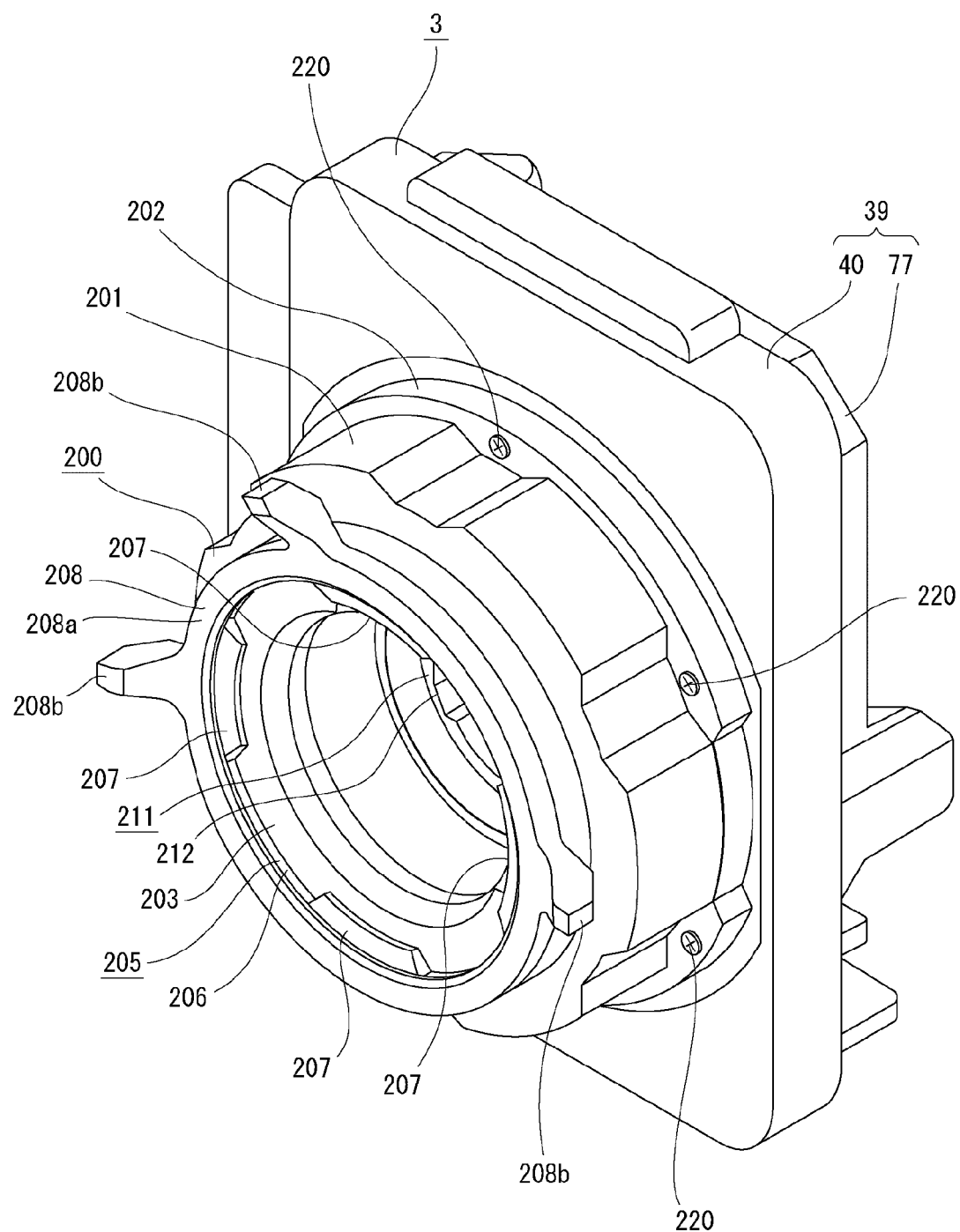
FIG. 27 is a perspective view showing a state where the second accessory is attached to the imaging unit.
Figure 28:
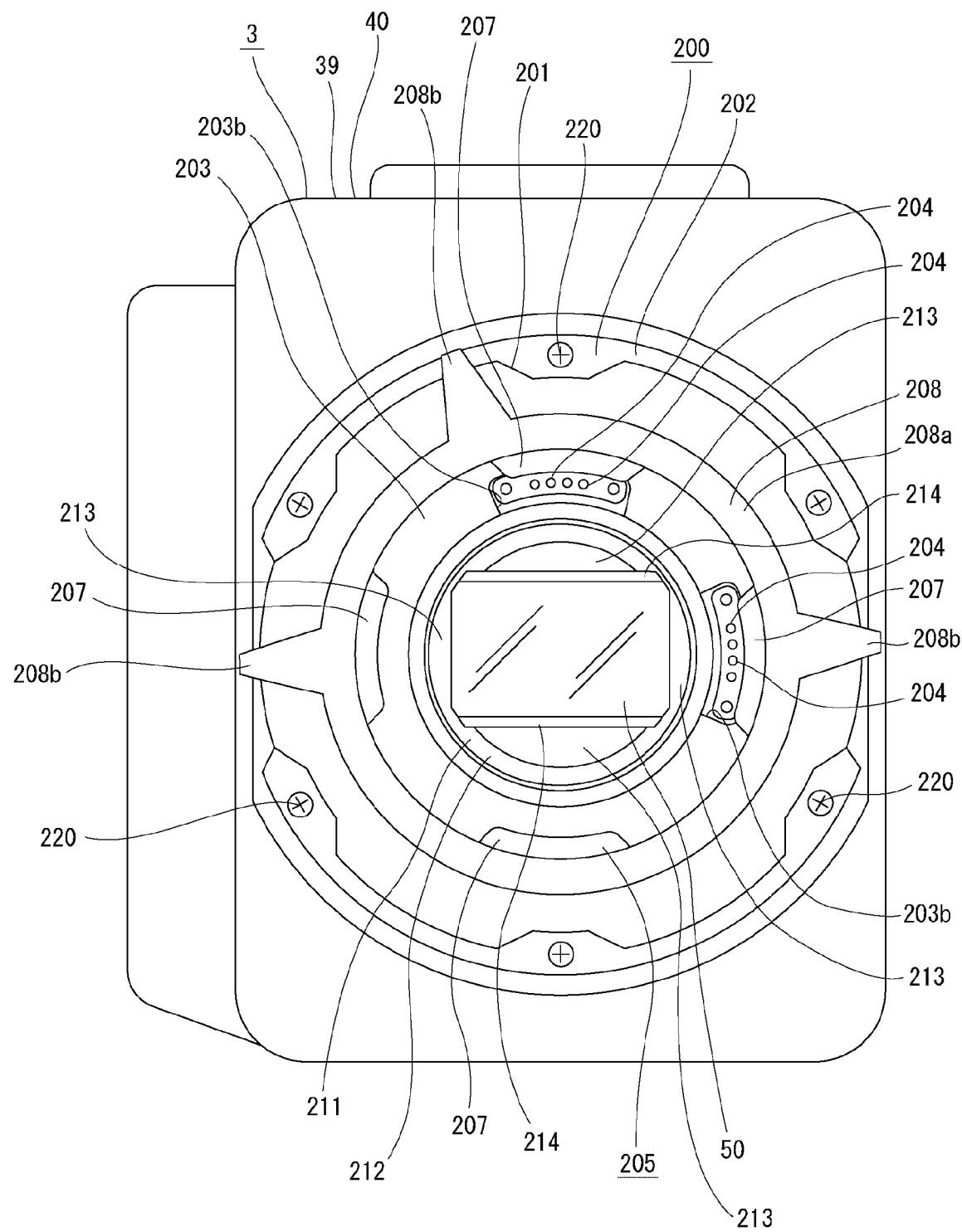
FIG. 28 is a front view showing a state where the second accessory is attached to the imaging unit.

Furthermore, the finder unit 85 can move the coupling axis part 90c in the right and left direction with respect to the axis holder 87 (see FIGS. 24 and 25).

Accordingly, it is possible to adjust the finder part 91a of the view body 91 to a desired position for use in the right and left direction, and ensure a more preferable capturing state.

Note that, in the finder unit 85, the guided member 88 may be enabled to be attached to one of the adjustment parts 17 by screwing an attachment screw (not shown) into a desired adjustment screw hole 17b in a direction in which the support axes 89 and 89 extend in right and left. Furthermore, in the finder unit 85, a configuration may be enabled in which the coupling axis part 90c of the rotation arm 90 may be inserted into the axis holders 86 and 87 instead of the support axis 89.

In these cases, since the coupling axis part 90c is set to extend in the front and rear direction, it is possible to set the viewfinder part 91a of the view body 91 in the direction viewed from the right and left direction, which increases the degree of freedom in the imaging mode, and ensure a more preferable capturing state.

<Configuration of Accessories and Attachment on Mount Part>

A first accessory 100 and a second accessory 200 are selectively attached to the mount part 41 of the imaging unit 3. Note that accessories other than the first accessory 100 and the second accessory 200 may be attachable to and detachable from the mount part 41.

The first accessory 100 is, for example, an interchangeable lens, and includes required parts arranged inside and outside an outer cylinder 101 (see FIG. 1). The first accessory 100 is attached to the imaging unit 3 in a state where a part of the first accessory 100 is in contact with the first mount surface 42 of the mount part 41.

Inside the outer cylinder 101, a plurality of lens groups (not shown) is arranged and spaced apart from each other in the optical axis direction. A portion near the rear end of the outer cylinder 101 is provided as a mounting part 102, and an outer circumferential part of the rear surface in the mounting part 102 is formed as a mounting surface 102a. The mounting part 102 is formed with a positioning hole (not shown) opened in the mounting surface 102a.

The rear end portion of the outer cylinder 101 is provided as a joint part 103. The joint part 103 is formed in a substantially cylindrical shape by protruding rearward from a portion inside the mounting surface 102a of the mounting part 102. Circular arc-shaped engagement pieces 104, 104, and 104 protruding outward are provided at the rear end portion of the joint part 103 so as to be spaced apart from each other in the circumferential direction. In the joint part 103, a plurality of terminals (not shown) located and arrayed in the circumferential direction is arranged. The diameter of the outer circumferential surface 103a of the joint part 103 is substantially the same as the inner diameter of the front case part 40, that is, the diameter of the positioning part 40e.

The first accessory 100 is attached to the mount part 41 of the imaging unit 3 as below.

First, in the first accessory 100, the positioning pin 42a of the mount part 41 is inserted into the positioning hole formed in the mounting part 102, the mounting surface 102a of the mounting part 102 is brought close to or in contact with the first mount surface 42, and the joint part 103 is inserted into the transmission hole 40a. At this time, the engagement pieces 104, 104, and 104 of the joint part 103 are inserted into the portions of the joint ring 46 between the engaging parts 46b, 46b, and 46b, respectively, and the engagement pieces 104, 104, and 104 are brought close to or in contact with the front surface of the filter holder 48. Furthermore, the terminals of the joint part 103 are connected to the contacts 51, 51, . . . .

Since the diameter of the outer circumferential surface 103a of the joint part 103 is substantially the same as the diameter of the positioning part 40e as described above, when the joint part 103 is inserted into the transmission hole 40a, the positioning part 40e performs positioning in a direction orthogonal to the optical axis direction of the first accessory 100.

Next, the attachment lever 45 is rotated and the joint ring 46 is rotated together with the attachment lever 45 with respect to the front case part 40. When the joint ring 46 is rotated, the screwing position of the screwing groove 46a with respect to the screw groove 40c is changed with the rotation of the joint ring 46, and the attachment lever 45 and the joint ring 46 are displaced together rearward with respect to the front case part 40. By rotating the joint ring 46, the engaging parts 46b, 46b, and 46b are located in the front side of the engagement pieces 104, 104, and 104, respectively, and the engaging parts 46b, 46b, and 46b are pressed against the engagement pieces 104, 104, and 104.

By pushing the engaging parts 46b, 46b, and 46b to the engagement pieces 104, 104, and 104, respectively, the engagement pieces 104, 104, and 104 are held between the engaging parts 46b, 46b, and 46b and the filter holder 48, and the first accessory 100 is attached to the mount part 41 in a state where the mounting surface 102a is in contact with the first mount surface 42.

The second accessory 200 is, for example, an adapter and has a substantially annular support base 201 (see FIGS. 2, 13, 26, 27, and 28). The support base 201 is formed with an annular recess 201a opened rearward. The annular recess 201a is formed in an annular shape. On the inner circumferential portion of the support base 201, an annular-shaped annular protrusion 201b protruding rearward is provided. The annular protrusion 201b is formed in a stepwise shape in cross section, and is formed in a shape in which the diameter decreases toward the rear. The outer diameter of a part of the annular protrusion 201b is substantially the same as the inner diameter of the front case part 40, that is, the diameter of the positioning part 40e.

A substantially annular mounting ring 202 is attached to the outer circumferential portion of the rear surface of the support base 201. The rear surface of the mounting ring 202 is formed as a mounting surface 202a. The mounting surface 202a is located in front of the rear surface of the annular protrusion 201b. The mounting ring 202 is formed with a positioning hole (not shown) opened in the mounting surface 202a. The mounting ring 202 is formed with screw insertion holes 202b, 202b, . . . penetrating in front and rear and spaced apart in the circumferential direction.

A receiving ring 203 is attached to the inner circumferential portion of the front end portion of the support base 201. A screw groove 203a is formed on the outer circumferential surface of the receiving ring 203. The receiving ring 203 is formed with notches 203b and 203b that are opened in the front and inward directions and are spaced apart from each other in the circumferential direction.

Contacts 204, 204, . . . are arranged and arrayed in the circumferential direction on the front surface of the support base 201. The contacts 204, 204, . . . are located in the notches 203b and 203b of the receiving ring 203.

The receiving ring 203 rotatably supports an attachment ring 205. The attachment ring 205 has a substantially annular ring part 206 and engaging parts 207, 207, . . . inwardly protruding from the front end portion of the annular part 206, respectively, and the engaging parts 207, 207, . . . are provided and spaced apart in the circumferential direction. A screwing groove 206a is formed on the inner circumferential surface of the annular part 206, and the screwing groove 206a is screwed into the screw groove 203a of the receiving ring 203.

An annular operation lever 208 is attached to the front end portion of the attachment ring 205. The operation lever 208 has an annular base part 208a and operation protrusions 208b, 208b, and 208b protruding from the base part 208a. The operation protrusions 208b, 208b, and 208b are provided so as to be spaced apart from each other in the circumferential direction.

A terminal arrangement member 209 is attached to the rear surface of the support base 201. The terminal arrangement member 209 is formed in a shape along the annular recess 201a of the support base 201, and has an annular escape recess 209a. Terminals 210, 210, . . . are arranged and arrayed in the circumferential direction on the rear surface of the lower end portion of the terminal arrangement member 209.

A window member 211 is attached to the inner circumferential surface of the annular protrusion 201b of the support base 201 by, for example, screwing, or the like. The window member 211 has a flange base 212 having a substantially annular shape, coupling surface portions 213, 213, . . . protruding from the rear end portion of the flange base 212 in a direction approaching to each other, and projecting protrusions 214, 214, . . . protruding rearward from inner edges in the coupling surface parts 213, 213, . . . .

For example, four coupling surface parts 213, 213, . . . are provided on the front, rear, right, and left sides, and are formed in a straight shape in which the inner edges extend in the right and left direction or the up and down direction.

On the inner surface of the window member 211, a so-called flocked coating is formed so as to have a texture in which a small number of flocked hairs are present.

In the second accessory 200, when the operation protrusion 208b is operated, the operation lever 208 and the attachment ring 205 are rotated together with respect to the receiving ring 203, and the screwing position of the screwing groove 206a with respect to the screw groove 203a is changed in accordance with the rotation, and the operation lever 208 and the attachment ring 205 are displaced together with respect to the receiving ring 203 in the front and rear direction.

The second accessory 200 is attached to the mount part 41 of the apparatus body 2 as below.

First, in the second accessory 200, the positioning pin 43a of the mount part 41 is inserted into the positioning hole formed in the mounting part 202, the mounting surface 202a of the mounting part 202 is pressed against the second mount surface 43 from the front side, and the annular protrusion 201b of the support base 201 and the portion of the window member 211 excluding the front end portion are inserted into the transmission hole 40a (see FIG. 13). At this time, the terminals 210, 210, . . . arranged on the terminal arrangement member 209 are connected to the contacts 47, 47, . . . . Furthermore, the operation protrusion 45c of the attachment lever 45 is inserted into the escape recess 209a of the terminal arrangement member 209.

In this way, since the terminal arrangement member 209 is formed with the escape recess 209a into which the operation protrusion 45c of the attachment lever 45 is inserted, when the second accessory 200 is mounted on the mount part 41, it is possible to perform a smooth attachment work to the mount part 41 of the second accessory 200 without interfering by the attachment lever 45 with the second accessory 200.

Since the diameter in a part of the annular protrusion 201b is substantially the same as the diameter of the positioning part 40e as described above, when the annular protrusion 201b is inserted into the transmission hole 40a, the positioning part 40e performs positioning in a direction orthogonal to the optical axis direction of the second accessory 200.

Next, screws 220, 220, . . . are inserted through the screw insertion holes 202b, 202b, . . . , respectively, and the screws 220, 220, . . . are screwed into the screw holes 40d, 40d, . . . , of the front case part 40, respectively, so that the second accessory 200 is attached to the mount part 41 in a state where the mounting surface 202a is in contact with the second mount surface 43.

In a state where the second accessory 200 is attached to the mount part 41, the window member 211 shields the contacts 51, 51, . . . to which the terminals of the first accessory 100 are connected.

Accordingly, since the contacts 51, 51, . . . are shielded when the first accessory 100 is not used, it is possible to prevent the reflection of light at the contacts 51, 51, . . . when the second accessory 200 is used and improve the quality of captured images.

Furthermore, in a state where the second accessory 200 is attached to the mount part 41, the projecting protrusions 214, 214, . . . of the window member 211 shield the opening edge of the holding part 49a of the holding member 49.

Accordingly, since the opening edge of the holding part 49a is shielded when the first accessory 100 is not used, it is possible to prevent the reflection of light at the holding part 49a when the second accessory 200 is used and further improve the quality of captured images.

Moreover, since the window member 211 has a flocked coating applied to the inner surface, reflection of light at the window member 211 is also prevented when the second accessory 200 is used, and it is possible to further improve the quality of the captured image.

Furthermore, the imaging unit 3 is formed with a positioning part 40e for positioning the first accessory 100 and the second accessory 200 in the direction orthogonal to the optical axis.

Accordingly, the positioning of the first accessory 100 and the second accessory 200 with respect to the housing 39 of the imaging unit 3 in the direction orthogonal to the optical axis is performed by the one positioning part 40e, and thus the same positioning accuracy with respect to the housing 39 is ensured when the first accessory 100 is mounted on the first mount surface 42 and when the second accessory 200 is mounted on the second mount surface 43, and it is possible to improve the quality of the image captured when the first accessory 100 is mounted and when the second accessory 200 is mounted.

A third accessory 300 is attached to the second accessory 200 in a state where the second accessory 200 is attached to the mount part 41 (see FIG. 2).

The third accessory 300 is, for example, an interchangeable lens, and includes required parts arranged inside and outside an outer cylinder 301.

Inside the outer cylinder 301, a plurality of lens groups (not shown) is arranged and spaced apart from each other in the optical axis direction. The rear end portion of the outer cylinder 301 is provided as a joint part 302. Circular arc-shaped engagement pieces 303, 303, . . . protruding outward are provided at the rear end portion of the joint part 302 so as to be spaced apart from each other in the circumferential direction. In the joint part 302, a plurality of terminals (not shown) spaced apart in the circumferential direction is arranged.

A capturing frame 304 is attachably and detachably attached to the front end portion of the outer cylinder 301.

The third accessory 300 is attached to the second accessory 200 as below.

First, in the third accessory 300, the rear surface of the joint part 302 is brought into close to or contact with the receiving ring 203 from the front side, and the joint part 302 is inserted inside the attachment ring 205. At this time, the engagement pieces 303, 303, . . . of the joint part 302 are inserted into the portions of the attachment ring 205 between the engaging parts 207, 207, . . . , respectively, and the engagement pieces 303, 303, . . . are brought close to or in contact with the front surface of the receiving ring 203.

Furthermore, the terminals of the joint part 302 are connected to the contacts 204, 204, . . . .

Next, the operation lever 208 is rotated and the attachment ring 205 is rotated together with the operation lever 208 with respect to the receiving ring 203. When the attachment ring 205 is rotated, the screwing position of the screwing groove 206a with respect to the screw groove 203a is changed with the rotation of the attachment ring 205, and the operation lever 208 and the attachment ring 205 are displaced together rearward with respect to the receiving ring 203. By rotating the attachment ring 205, the engaging parts 207, 207, . . . are located in the front side of the engagement pieces 303, 303, . . . , respectively, and the engaging parts 207, 207, . . . are pressed against the engagement pieces 303, 303, . . . .

The engaging parts 207, 207, . . . are pressed against the engagement pieces 303, 303, . . . , so that the engagement pieces 303, 303, . . . are held between the engaging parts 207, 207, . . . and the receiving ring 203, and the third accessory 300 is attached to the second accessory 200.

As described above, the imaging apparatus 1 includes: the housing 39 having the mount part 41 to which at least the first accessory 100 and the second accessory 200 are selectively attached; and an imaging element 72b that photoelectrically converts captured light into an electrical signal, in which the mount part 41 is formed with the first mount surface 42 to which the first accessory 100 is attached, and the second mount surface 43 to which the second accessory 200 is attached, and the first mount surface 42 and the second mount surface 43 are located on the same plane.

Accordingly, since the first accessory 100 and the second accessory 200 are attached to the first mount surface 42 and the second mount surface 43, which are located on the same plane, respectively, regardless of which of the first accessory 100 and the second accessory 200 is attached to the mount part 41, it is possible to ensure preferable optical performance and improve image quality.

In particular, regardless of which of the first accessory 100 and the second accessory 200 is attached to the mount part 41, it is possible to ensure high accuracy of the length of the flange back, and improve image quality by ensuring preferable optical performance.

Furthermore, since the first mount surface 42 and the second mount surface 43 are each formed as a part of the front case part 40, the first mount surface 42 and the second mount surface 43 are formed in the same member, it is possible to ensure high planar accuracy of the first mount surface 42 and the second mount surface 43, reduce the number of parts, and improve the strength.

<Cooling Operation in Imaging Apparatus>

In the imaging apparatus 1 configured as described above, in a state where the imaging unit 3 is attached to the apparatus body 2 and the first accessory 100 or the second accessory 200 and the third accessory 300 are attached to the mount part 41, during use such as capturing, the cooling fan 29 is rotated with the power being turned on.

When the cooling fan 29 is rotated, convection occurs with the rotation of the cooling fan 29 (see FIG. 9). When the cooling fan 29 is rotated, the external air is flowed from the inflow holes 10a, 10a, . . . formed in the side surface part 10 of the outer panel 4 to the inside of the outer panel 4 as cooling air, and the air that has flowed into is made to flow from the intake hole 26a formed in the side surface plate 26 of the outer casing 5 through the ventilation hole 30a of the cooling fan 29, is exhausted from the exhaust holes 19a, 19a, . . . formed in the side surface plate 19, and flows out from the outflow holes 11a, 11a, . . . formed in the side surface part 12 of the outer panel 4.

At this time, the cooling air is made to flow from the intake hole 26a toward the cooling fan 29 along the heat radiation fins 28, 28, . . . , and flow from the cooling fan 29 toward the exhaust holes 19a, 19a, . . . along the heat radiation fins 24, 24.

When the imaging apparatus 1 is used for capturing or the like, heat is generated in the first circuit board 35, the second circuit board 36, the third circuit board 37, and the fourth circuit board 38 of the apparatus body 2 and heat is generated in the first control board 74, the second control board 75, and the element control board 72c of the imaging unit 3.

The heat generated in the first circuit board 35 is mainly transferred from the first joint parts 28a, 28a, . . . to the heat radiation fins 28, 28, . . . . The heat generated in the second circuit board 36 is mainly transferred from the rear surface plate 27 to the heat radiation fins 28, 28, . . . through the side surface plate 19 and is also transferred from the rear surface plate 27 through the bottom surface plate 21 to the heat radiation fins 24, 24, . . . . The heat generated in the third circuit board 37 is mainly transferred to the heat radiation fins 28, 28, . . . through the side surface plate 19. The heat generated in the fourth circuit board 38 is mainly transferred from the second joint parts 28b, 28b, . . . to the heat radiation fins 28, 28, . . . .

In this way, the heat generated in the first circuit board 35, the second circuit board 36, the third circuit board 37, and the fourth circuit board 38 is all transferred to the heat radiation fins 28, 28, . . . , or the heat radiation fins 24, 24, . . . . Accordingly, the heat is efficiently radiated from the heat radiation fins 28, 28, . . . or the heat radiation fins 24, 24, . . . by the cooling air that flows from the intake hole 26a toward the cooling fan 29 along the heat radiation fins 28, 28, . . . and flows from the cooling fan 29 to the exhaust holes 19a, 19a, . . . along the heat radiation fins 24, 24, . . . , so that the temperature rise of the first circuit board 35, the second circuit board 36, the third circuit board 37, and the fourth circuit board 38 is suppressed.

Furthermore, the heat generated in the first control board 74, the second control board 75, and the element control board 72c of the imaging unit 3 is mainly transferred to the heat radiation fins 78b, 78b, . . . through the board holder 73, the heat transfer member 76, and the attachment plate 78a.

At this time, since the heat radiation fins 78b, 78b, . . . are located in the cooling flow path of the cooling air, the cooling air efficiently radiates heat from the heat radiation fins 78b, 78b, . . . , so that the temperature rise of the first control board 74, the second control board 75, and the element control board 72c is suppressed.

As described above, the imaging apparatus 1 includes: the outer casing 5 formed with the insertion hole 25b into which the cooling fan 29 is inserted; and the imaging unit 3 that has the imaging element 72b, is attachable to and detachable from the outer casing 5, and covers the insertion hole 25b in a state of being attached to the outer casing 5, in which the cooling fan 29 is attachable to and detachable from the outer casing 5 through the insertion hole 25b in a state where the imaging unit 3 is detached from the outer casing 5.

Accordingly, by detaching the imaging unit 3 from the outer casing 5, it is possible to pull out the cooling fan 29 from the insertion hole 25b and remove the cooling fan 29 from the outer casing 5, so that it is possible to improve the maintainability of the cooling fan 29 and ensure a preferable operation state of the imaging apparatus 1.

Furthermore, the outer casing 5 has the top surface plate 20 that faces the up and down direction, and the circumferential surface plate 22 whose upper edge is continuous to at least a part of the outer circumferential edge of the top surface plate 20, and an insertion hole 25b is formed in the circumferential surface plate 22.

Accordingly, since the insertion hole 25b is not formed in the top surface plate 20, moisture such as rainwater is less likely to enter the inside of the outer casing 5 through the insertion hole 25b, and it is possible to improve the waterproof property for each part arranged inside the outer casing 5.

Moreover, the outer casing 5 is provided with the pair of opposing side surface plates 19 and 26, the side surface plate 26 is formed with the an intake hole 26a that takes in external air as cooling air, and the side surface plate 19 is formed with exhaust holes 19a, 19a, . . . that exhaust the cooling air taken from the intake hole 26a into the inside of the outer casing 5.

Accordingly, since the cooling flow path is formed between the side surface plate 19 and the side surface plate 26, the cooling air is smoothly flowed inside the outer casing 5, and it is possible to improve the cooling efficiency for each part arranged inside the outer casing 5 and each part attached to the outer casing 5.

Furthermore, since the intake hole 26a and the exhaust holes 19a, 19a, . . . are not formed in the top surface plate 20, moisture such as rainwater is less likely to enter the inside of the outer casing 5 through the intake hole 26a and the exhaust holes 19a, 19a, . . . , and it is possible to improve the waterproof property for each part arranged inside the outer casing 5.

Moreover, by the rotation of the cooling fan 29, a cooling flow path for cooling air from the intake hole 26a through the cooling fan 29 to the exhaust holes 19a, 19a, . . . is formed, and the heat radiation fins 24, 24, . . . , 28, 28, . . . joined to the outer casing 5 are located in the cooling flow path.

Accordingly, the heat generated in the first circuit board 35, the second circuit board 36, the third circuit board 37, and the fourth circuit board 38 is transferred from the outer casing 5 to the heat radiation fin, and is radiated from the heat radiation fins 24, 24, . . . , 28, 28, . . . to the cooling flow path, so that it is possible to further improve the cooling efficiency with respect to each part arranged inside the outer casing 5 and each part attached to the outer casing 5.

Moreover, the outer casing 5 is formed by a material having thermal conductivity, the first circuit board 35, the second circuit board 36, the third circuit board 37, and the fourth circuit board 38 are attached to the outer casing 5, and the cooling fan 29 is arranged at a position surrounded by the first circuit board 35, the second circuit board 36, the third circuit board 37, and the fourth circuit board 38.

Accordingly, since the cooling fan 29 is located inside the first circuit board 35, the second circuit board 36, the third circuit board 37, and the fourth circuit board 38, the cooling flow path of the cooling air is formed inside the first circuit board 35, the second circuit board 36, the third circuit board 37, and the fourth circuit board 38, and it is possible to improve the cooling efficiency for the first circuit board 35, the second circuit board 36, the third circuit board 37, and the fourth circuit board 38.

Furthermore, since the cooling fan 29 is located inside the first circuit board 35, the second circuit board 36, the third circuit board 37, and the fourth circuit board 38, the space inside the outer casing 5 can be effectively utilized as a space for arranging the cooling fan 29, and it is possible to downsize the imaging apparatus 1 while the cooling efficiency is improved.

Moreover, the first control board 74, the second control board 75, and the element control board 72c are arranged inside the imaging unit 3, the heat radiation fins 78b, 78b, . . . that radiate heat generated in the first control board 74, the second control board 75, and the element control board 72c are provided in the imaging unit 3, the fin insertion hole 25a into which the heat radiation fins 78b, 78b, . . . are inserted is formed in the outer casing 5, and the heat radiation fins 78b, 78b, . . . are located in the cooling flow path in a state where the imaging unit 3 is attached to the outer casing 5.

Accordingly since the temperature rise of the first control board 74, the second control board 75, and the element control board 72c is suppressed by the cooling air taken in from the intake hole 26a in a state where the imaging unit 3 is attached to the outer casing 5, the first control board 74, the second control board 75, and the element control board 72c do not require a dedicated cooling means for suppressing the temperature rise, and it is possible to improve the cooling efficiency for the first control board 74, the second control board 75, and the element control board 72c while the structure is simplified.

In addition, the outer casing 5 is provided with the frame surface part 23 in which the inner space is formed as the arrangement space 5a, and the imaging unit 3 is attached to the outer casing 5 in a state where at least a part of the imaging unit 3 is inserted into the arrangement space 5a.

Accordingly, since the imaging unit 3 is attached to the outer casing 5 in a state where at least a part of the imaging unit 3 is inserted into the arrangement space 5a, the imaging unit 3 can be easily attached to the outer casing 5, and it is possible to ensure a stable attachment state of the imaging unit 3 to the outer casing 5.

<Embodiment of Imaging Apparatus>

Figure 29:
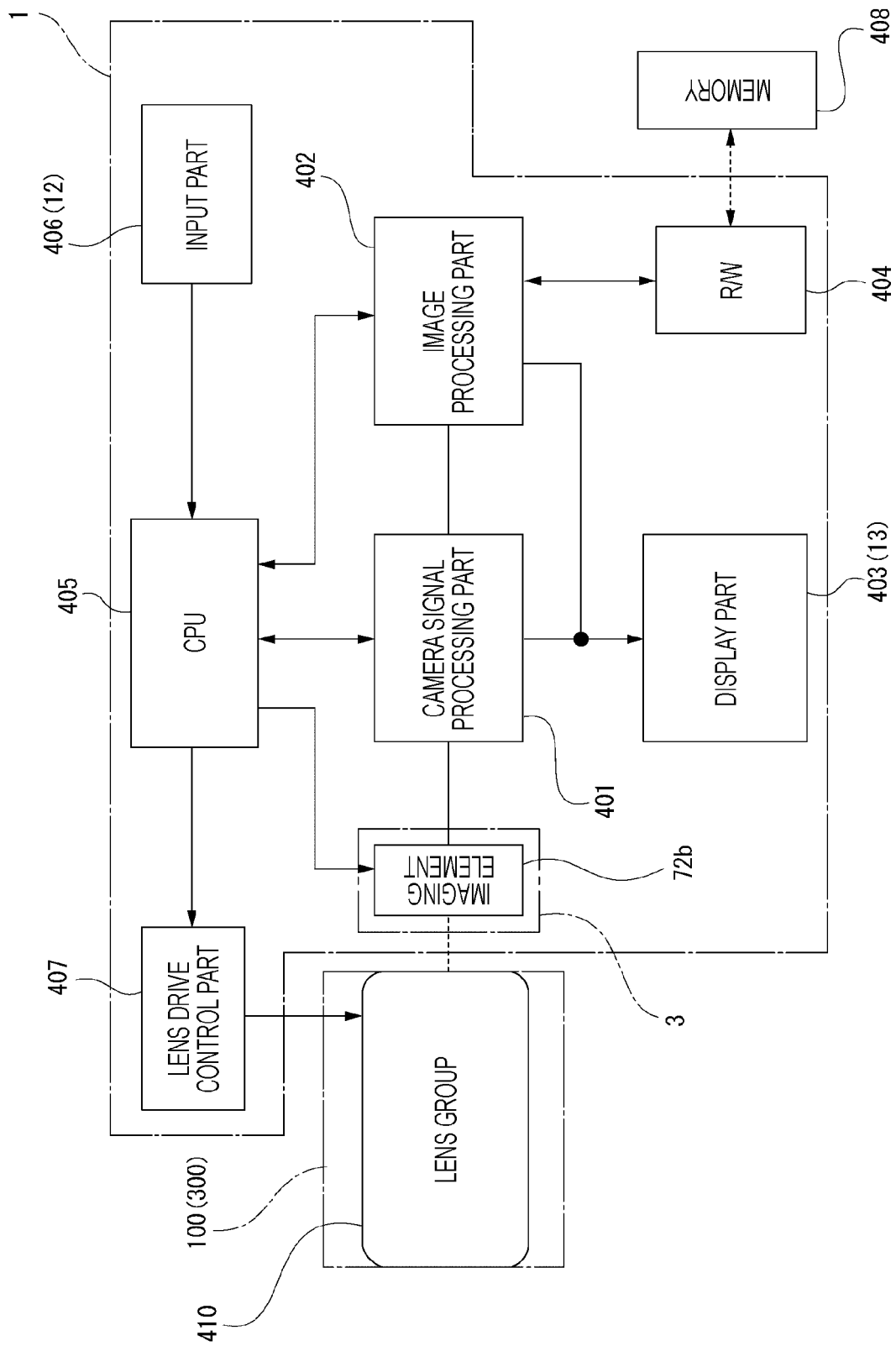
FIG. 29 is a block diagram of the imaging apparatus.

The block diagram of a video camera according to an embodiment of the imaging apparatus of the present technology will be shown below (see FIG. 29).

The imaging apparatus (video camera) 1 includes: the imaging element 72b having a photoelectric conversion function for converting the captured light into an electric signal; a camera signal processing part 401 that performs signal processing such as analog-digital conversion of a captured image signal; and an image processing part 402 that performs recording and reproduction processing of the image signal. Furthermore, the imaging apparatus 1 includes: a display part 403 (display part 13) that displays a captured image and the like; a reader/writer (R/W) 404 that writes and reads an image signal to and from a memory 408; a central processing unit (CPU) 405 that controls the entire imaging apparatus 1; an input part 406 (operation part 12) such as various switches with which required operation is performed by a user; and a lens drive control part 407 that controls the drive of the lens provided in the first accessory 100 or the third accessory 300.

The camera signal processing part 401 performs various types of signal processing such as conversion of an output signal from the imaging element 72b into a digital signal, noise removal, image quality correction, and conversion into a luminance/color difference signal.

The image processing part 402 performs compression encoding/decompression decoding processing of an image signal based on a predetermined image data format, conversion processing of data specifications such as resolution, and the like.

The display part 403 has a function of displaying various types of data such as an operation state of the user with respect to the input part 406 and a captured image.

The R/W 404 writes the image data encoded by the image processing part 402 in the memory 408 and reads the image data recorded in the memory 408.

The CPU 405 functions as a control processing part that controls each circuit block provided in the imaging apparatus 1, and controls each circuit block on the basis of an instruction input signal or the like from the input part 406.

The input part 406 outputs an instruction input signal to the CPU 405 according to a user operation.

The lens drive control part 407 controls a motor or the like (not shown) that drives the lens groups 410, 410, . . . on the basis of a control signal from the CPU 405.

The memory 408 is, for example, a semiconductor memory that can be attached to and detached from a slot connected to the R/W 404. Note that the memory 408 may not be removable from the slot, but may be incorporated inside the imaging apparatus 1.

The operation of the imaging apparatus 1 will be described below.

In a standby state for imaging, under the control of the CPU 405, the captured image signal is output to the display part 403 via the camera signal processing part 401 and displayed as a camera through image. Furthermore, when an instruction input signal for zooming is input from the input part 406, the CPU 405 outputs a control signal to the lens drive control part 407, and the predetermined lens group 410 is moved on the basis of the control of the lens drive control part 407.

When imaging is performed by the instruction input signal from the input part 406, the photographed image signal is output from the camera signal processing part 401 to the image processing part 402, compression-coded, and converted into digital data in a predetermined data format. The converted data is output to the R/W 404 and written in the memory 408.

Focusing is performed by the lens drive control part 407 moving the predetermined lens group 410 on the basis of a control signal from the CPU 405.

In a case of reproducing the image data recorded in the memory 408, predetermined image data is read from the memory 408 by the R/W 404 according to operation on the input part 406, expansion decoding processing is performed by the image processing part 402, then the reproduced image signal is output to the display part 403, and the reproduced image is displayed.

Note that, in the present technology, "imaging" refers to processing including only part or all of a series of: photoelectric conversion processing of converting captured light into an electric signal by the imaging element 72b; processing for an output signal from the imaging element 72b of conversion into a digital signal, noise removal, image quality correction, conversion into luminance/color difference signals, and the like by the camera signal processing part 401; compression coding/decompression decoding processing of an image signal based on a predetermined image data format, and conversion processing of data specifications such as resolution by the image processing part 402; and processing of writing an image signal in the memory 408 by the R/W 404.

That is, "imaging" may refer only to photoelectric conversion processing of converting captured light into an electric signal by the imaging element 72b, may refer to photoelectric conversion processing of converting captured light into an electric signal by the imaging element 72b, and processing for an output signal from the imaging element 72b of conversion into a digital signal, noise removal, image quality correction, conversion into luminance/color difference signals, and the like by the camera signal processing part 401, may refer to photoelectric conversion processing of converting captured light into an electric signal by the imaging element 72b, processing for an output signal from the imaging element 72b of conversion into a digital signal, noise removal, image quality correction, conversion into luminance/color difference signals, and the like by the camera signal processing part 401, and then compression coding/decompression decoding processing of an image signal based on a predetermined image data format, and conversion processing of data specifications such as resolution by the image processing part 402, may refer to through photoelectric conversion processing of converting captured light into an electric signal by the imaging element 72b, processing for an output signal from the imaging element 72b of conversion into a digital signal, noise removal, image quality correction, conversion into luminance/color difference signals, and the like by the camera signal processing part 401, and compression coding/decompression decoding processing of an image signal based on a predetermined image data format, and conversion processing of data specifications such as resolution by the image processing part 402, and may refer to processing up to processing of writing an image signal in the memory 408 by the R/W 404. In the processing described above, the order of each processing may be appropriately changed.

Furthermore, in the present technology, the imaging unit and the imaging apparatus may include only a part or all of the imaging element 72b, the camera signal processing part 401, the image processing part 402, and the R/W 404 that perform the processing described above.

Furthermore, the imaging unit may include a part of the imaging element 72b, the camera signal processing part 401, the image processing part 402, and the R/W 404, and the apparatus body 2 may include the rest.

Present Technology

The present technology can adopt the following configuration.

(1)

An imaging apparatus including:

a housing having a mount part to which at least a first accessory and a second accessory are selectively attached; and an imaging element that photoelectrically converts captured light into an electrical signal, in which the mount part is formed with a first mount surface to which the first accessory is attached, and a second mount surface to which the second accessory is attached, and the first mount surface and the second mount surface are located on the same plane.

(2)

The imaging apparatus according to (1) above, in which the first mount surface and the second mount surface are formed as parts of the same member.

(3)

The imaging apparatus according to (1) or (2) above, in which a contact is provided to which a terminal of the first accessory is connected in a state where the first accessory is attached to the first mount surface, and the contact is shielded by the second accessory in a state where the second accessory is attached to the second mount surface.

(4)

The imaging apparatus according to any one of (1) to (3) above, in which a positioning part that positions the first accessory and the second accessory in a direction orthogonal to an optical axis is formed in the housing.

(5)

The imaging apparatus according to any one of (1) to (4) above, further including:

a first filter body having at least one neutral density filter that is located on the optical axis and reduces the amount of light toward the imaging element; and a second filter body having at least one neutral density filter that is spaced apart from the first filter body on the optical axis and reduces the amount of light toward the imaging element, in which the first filter body and the imaging element are located on the opposite side with the second filter body sandwiched therebetween, and the neutral density filter having the lowest optical density among the neutral density filters is provided in the first filter body.

(6)

The imaging apparatus according to (5) above, in which an infrared cut filter is arranged on the opposite side of the second filter body with the first filter body sandwiched therebetween.

(7)

The imaging apparatus according to (5) or (6) above, in which each of the first filter body and the second filter body is rotatable, and the first filter body and the second filter body are provided with a plurality of the neutral density filters having different optical densities and spaced apart in the circumferential direction.

(8)

An imaging unit including:

a housing having a mount part to which at least a first accessory and a second accessory are selectively attached; and an imaging element that is arranged inside the housing, and photoelectrically converts captured light into an electrical signal, in which the mount part is formed with a first mount surface to which the first accessory is attached, and a second mount surface to which the second accessory is attached, and the first mount surface and the second mount surface are located on the same plane.

(9)

An imaging apparatus including:

an imaging element that photoelectrically converts captured light into an electrical signal;

a first filter body having at least one neutral density filter that is located on an optical axis and reduces the amount of light toward the imaging element; and a second filter body having at least one neutral density filter that is spaced apart from the first filter body on the optical axis and reduces the amount of light toward the imaging element, in which the first filter body and the imaging element are located on the opposite side with the second filter body sandwiched therebetween, and the neutral density filter having the lowest optical density among the neutral density filters is provided in the first filter body.

(10)

The imaging apparatus according to (9) above, in which an infrared cut filter is arranged on the opposite side of the second filter body with the first filter body sandwiched therebetween.

The imaging apparatus according to (9) or (10) above, in which each of the first filter body and the second filter body is rotatable, and the first filter body and the second filter body are provided with a plurality of the neutral density filters having different optical densities and spaced apart in the circumferential direction.

(12)

An imaging unit including:

a housing having a mount part to which an accessory is attached;

an imaging element that is arranged inside the housing, and photoelectrically converts captured light into an electrical signal;

a first filter body having at least one neutral density filter that is located on the optical axis and reduces the amount of light toward the imaging element; and a second filter body having at least one neutral density filter that is spaced apart from the first filter body on the optical axis and reduces the amount of light toward the imaging element, in which the first filter body and the imaging element are located on the opposite side with the second filter body sandwiched therebetween, and the neutral density filter having the lowest optical density among the neutral density filters is provided on the first filter body.

REFERENCE SIGNS LIST

1 Imaging apparatus
3 Imaging unit
39 Housing
41 Mount part
42 First mount surface
43 Second mount surface
50 Infrared cut filter
51 Contact
53 First filter body
54 Second filter body
62 First neutral density filter
63 Second neutral density filter
65 Third neutral density filter
66 Fourth neutral density filter
72b Imaging element
100 First accessory
200 Second accessory

The invention claimed is:

1. An imaging apparatus, comprising:
   a housing having a mount part to which at least a first accessory and a second accessory are selectively attached; and
   an imaging element that photoelectrically converts captured light into an electrical signal,
   wherein the mount part is formed with a first mount surface to which the first accessory is attached, and a second mount surface to which the second accessory is attached,
   the second mount surface is an annulus, is spaced apart from the first mount surface in a radial direction of the mount part, and encloses the first mount surface, and
   the first mount surface and the second mount surface are located on a same plane.

2. The imaging apparatus according to claim 1,
   wherein the first mount surface and the second mount surface are formed as parts of a same member.

3. The imaging apparatus according to claim 1,
   wherein a contact is provided to which a terminal of the first accessory is connected in a state where the first accessory is attached to the first mount surface, and
   the contact is shielded by the second accessory in a state where the second accessory is attached to the second mount surface.

4. The imaging apparatus according to claim 1,
   wherein a protrusion that positions the first accessory and the second accessory in a direction orthogonal to an optical axis is formed in the housing.

5. The imaging apparatus according to claim 1, further comprising:
   a first filter body having at least one neutral density filter that is located on an optical axis and reduces an amount of light toward the imaging element; and
   a second filter body having at least one neutral density filter that is spaced apart from the first filter body on the optical axis and reduces the amount of light toward the imaging element,
   wherein the first filter body and the imaging element are located on opposite sides of the second filter body with the second filter body sandwiched therebetween, and
   a particular neutral density filter having a lowest optical density among the neutral density filters is provided in the first filter body.

6. The imaging apparatus according to claim 5,
   wherein an infrared cut filter is arranged on the opposite side of the second filter body with the first filter body sandwiched therebetween.

7. The imaging apparatus according to claim 5,
   wherein each of the first filter body and the second filter body is rotatable, and
   each of the first filter body and the second filter body are provided with a plurality of the neutral density filters having different optical densities and spaced apart in a circumferential direction.

8. The imaging apparatus of claim 1, wherein the first mount surface is an annulus.

9. The imaging apparatus of claim 1, further comprising:
   first contacts to be connected to terminals of the first accessory, and second contacts to be connected to terminals of the second accessory,
   wherein the second contacts are located between the first and second mount surfaces in the radial direction of the mount part.

10. An imaging unit, comprising:
    a housing having a mount part to which at least a first accessory and a second accessory are selectively attached; and
    an imaging element that is arranged inside the housing, and photoelectrically converts captured light into an electrical signal,
    wherein the mount part is formed with a first mount surface to which the first accessory is attached, and a second mount surface to which the second accessory is attached,
    the second mount surface is an annulus, is spaced apart from the first mount surface in a radial direction of the mount part, and encloses the first mount surface, and
    the first mount surface and the second mount surface are located on a same plane.

11. An imaging apparatus, comprising:
an imaging element that photoelectrically converts captured light into an electrical signal;
a first filter body having at least one neutral density filter that is located on an optical axis and reduces an amount of light toward the imaging element; and
a second filter body having at least one neutral density filter that is spaced apart from the first filter body on the optical axis and reduces the amount of light toward the imaging element,
wherein the first filter body and the imaging element are located on opposite sides of the second filter body with the second filter body sandwiched therebetween, and
each neutral density filter provided in the first filter body has a lower optical density than each neutral density filter provided in the second filter body.

12. The imaging apparatus according to claim 11,
wherein an infrared cut filter is arranged on the opposite side of the second filter body with the first filter body sandwiched therebetween.

13. The imaging apparatus according to claim 11,
wherein each of the first filter body and the second filter body is rotatable, and
each of the first filter body and the second filter body are provided with a plurality of the neutral density filters having different optical densities and spaced apart in a circumferential direction.

* * * * *